United States Patent
Kumagai et al.

(10) Patent No.: US 8,572,319 B2
(45) Date of Patent: Oct. 29, 2013

(54) METHOD FOR CALCULATING TIER RELOCATION COST AND STORAGE SYSTEM USING THE SAME

(75) Inventors: Naoko Kumagai, Isehara (JP); Tsutomu Sukigara, Oiso (JP); Tetsuya Abe, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 110 days.

(21) Appl. No.: 13/263,664

(22) PCT Filed: Sep. 28, 2011

(86) PCT No.: PCT/JP2011/005454
§ 371 (c)(1),
(2), (4) Date: Oct. 7, 2011

(87) PCT Pub. No.: WO2013/046258
PCT Pub. Date: Apr. 4, 2013

(65) Prior Publication Data
US 2013/0080703 A1   Mar. 28, 2013

(51) Int. Cl.
*G06F 12/16* (2006.01)
(52) U.S. Cl.
USPC ........... 711/117; 711/114; 711/161; 711/162; 711/165
(58) Field of Classification Search
USPC .......................... 711/114, 117, 161, 162, 165
See application file for complete search history.

(56) References Cited

U.S. PATENT DOCUMENTS

| | | | |
|---|---|---|---|
| 6,819,326 B2 * | 11/2004 | Jaspers ........................ | 345/568 |
| 7,441,093 B2 * | 10/2008 | Ganjoo et al. ................ | 711/165 |
| 8,006,061 B1 | 8/2011 | Chatterjee et al. | |
| 8,239,644 B2 * | 8/2012 | Asano et al. .................. | 711/161 |
| 2006/0085329 A1 | 4/2006 | Eguchi | |
| 2008/0005508 A1 * | 1/2008 | Asano et al. .................. | 711/161 |
| 2011/0010343 A1 | 1/2011 | Chavda et al. | |

FOREIGN PATENT DOCUMENTS

| | | |
|---|---|---|
| JP | 2003-140836 | 5/2003 |
| JP | 2006-113824 | 4/2006 |

OTHER PUBLICATIONS

PCT/JP2011/005454, International Search Report and Written Opinion of International Searching Authority, mail date Jul. 4, 2012; 14 pages.

Rasool, Qaisar et al: "A Comparative Study of Replica Placement Strategies in Data Grids", Jun. 16, 2007, Advances in Web and Network Technologies, and Information Management; [Lecture Notes in Computer Science], Springer Berlin Heidelberg, Berlin, Heidelberg, pp. 135-143, XP019095130, ISBN: 978-3-540-72908-2.

(Continued)

*Primary Examiner* — John Lane
(74) *Attorney, Agent, or Firm* — Foley & Lardner LLP

(57) ABSTRACT

Conventionally, the fees for using services of a storage system was calculated based on the status of use or access performance of storage areas and not based on migration of data. The present invention provides a storage system in which multiple tiers composed of storage areas of various memory devices are assigned in page units and the assigned tiers are changed based on access frequency, wherein stored costs are calculated based on status of use of the storage areas constituting the tiers, and migration costs are calculated and charged based on the amount of migration of data among tiers and the I/O access counts after migration, according to which appropriate charging of cost for using the storage system is enabled.

12 Claims, 21 Drawing Sheets

(56) References Cited

OTHER PUBLICATIONS

Arumugam, Rajesh Vellore: "Information Lifecycle Management in an Object-based Tiered Storage Platform," Storage Unlimited, Apr. 1, 2004, pp. 1-6, XP55030996, Retrieved from the Internet: URL:http://www.dsi.a-star.edu.sg/news-events/enewsletter/Documents/DSI%20AprJun09_Final.pdf [retrieved on Jun. 25, 2012].

Das, Sudipto et al, "Live Database Migration for Elasticity in a Multitenant Database for Cloud Platforms," UCSB Computer Science Technical Report Sep. 2010, Jan. 1, 2010, pp. 1-14, XP55030999, Retrieved from the Internet:URL:http://cs.ucsb.edu/research/tech_reports/reports/2010-09.pdf [retrieved on Jun. 25, 2010].

\* cited by examiner

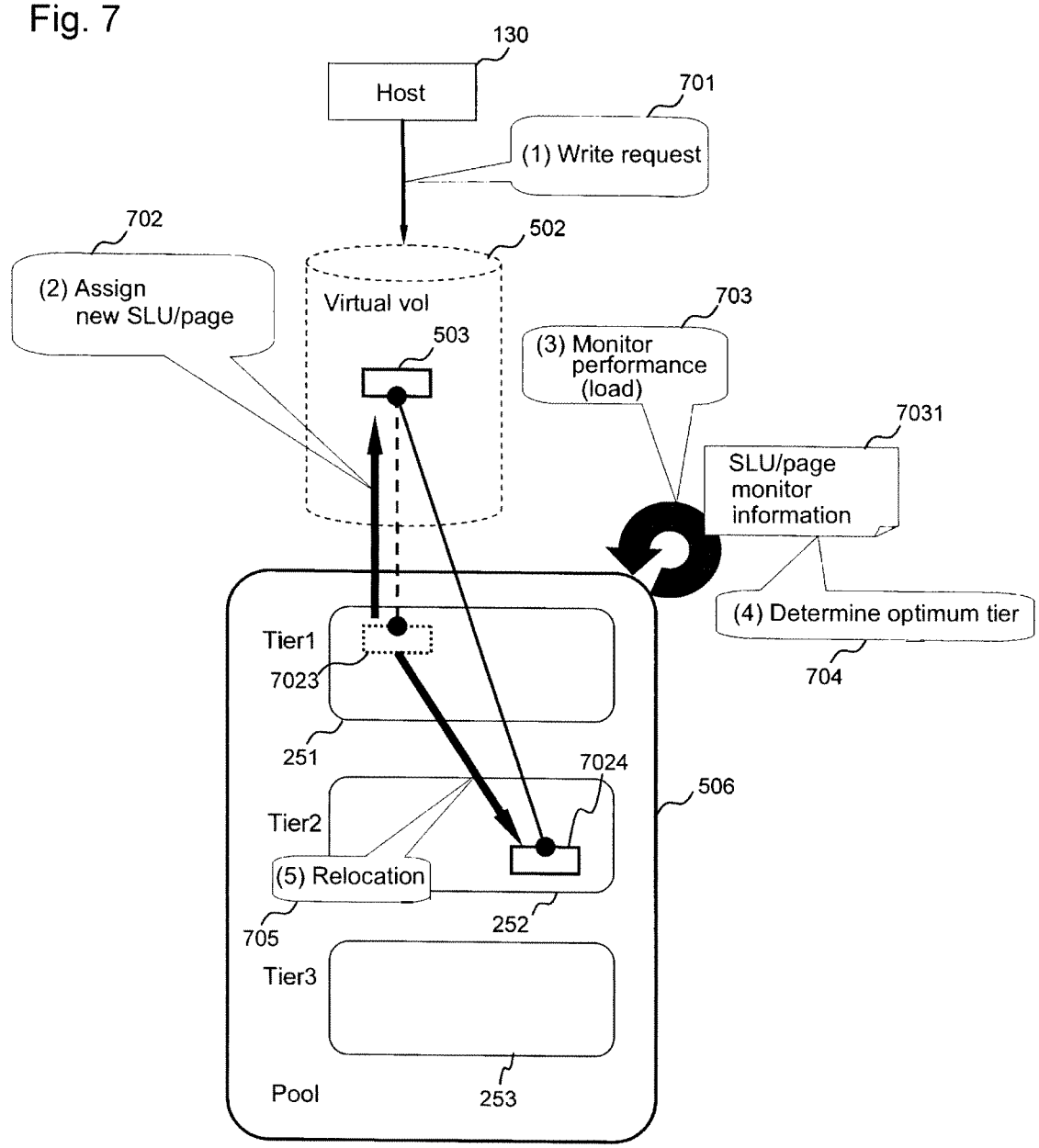

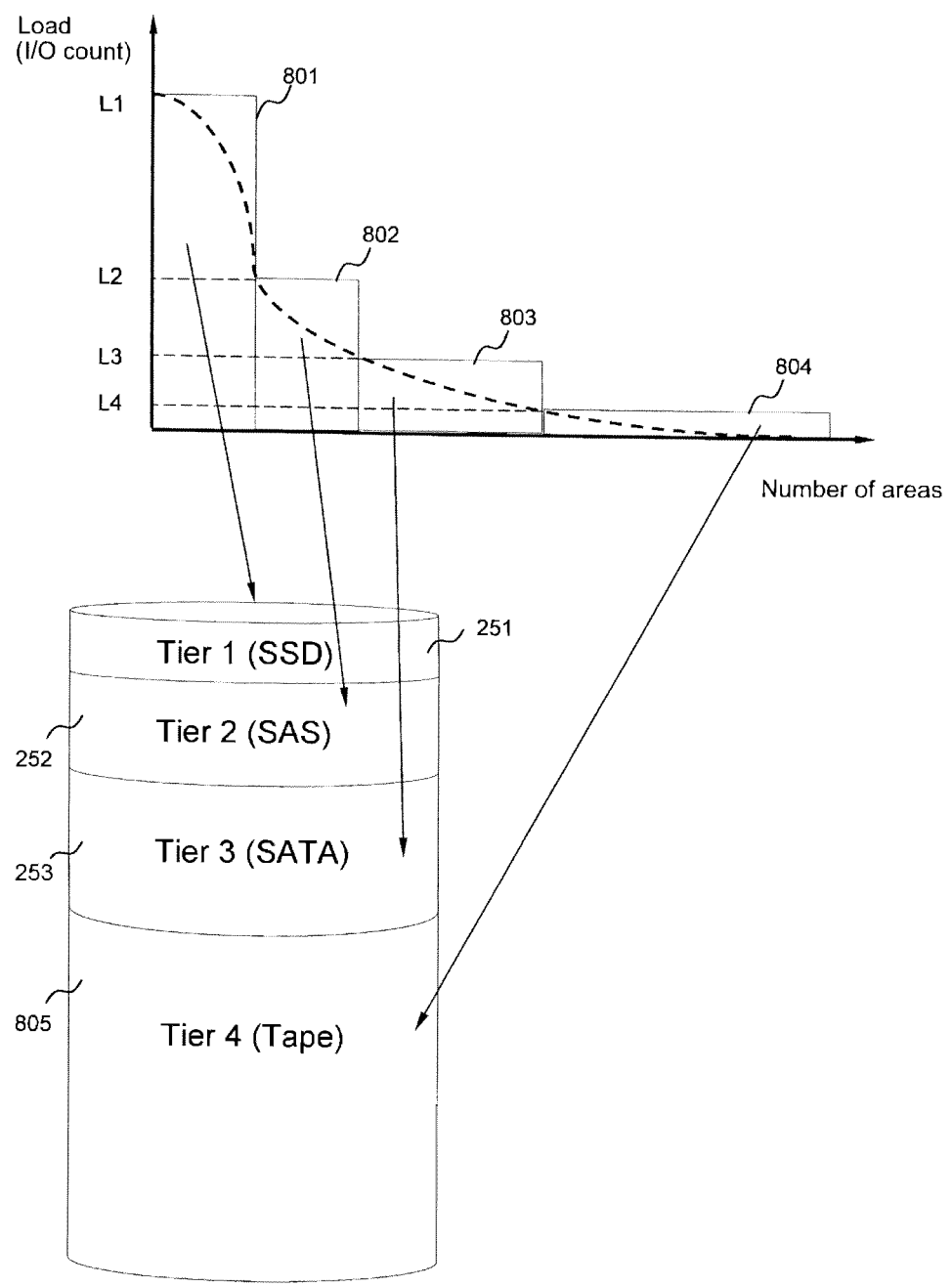

| Host LU number | Virtual storage area number | Start address | Size | SLU number | Current Tier | I/O count |
|---|---|---|---|---|---|---|
| HLU-1 | 0001 | 0x00000000 | 1GB | SLU-11 | 1 | 89 |
| HLU-1 | 0002 | 0x0000f000 | 1GB | SLU-14 | 3 | 20 |
| HLU-1 | 0003 | 0x000f0000 | 1GB | SLU-13 | 1 | 75 |
| HLU-1 | 0004 | 0x00100000 | 1GB | SLU-15 | 2 | 55 |
| HLU-1 | 0005 | 0x004f0000 | 1GB | SLU-19 | 2 | 70 |
| HLU-1 | 0006 | 0x01000000 | 1GB | SLU-12 | 3 | 35 |
| HLU-1 | 0007 | 0x014f0000 | 1GB | SLU-16 | 3 | 50 |
| : | : | : | : | | | |
| HLU-N | 0001 | 0x00000000 | 1GB | SLU-N4 | 1 | 90 |
| HLU-N | 0002 | 0x01000000 | 1GB | SLU-N3 | 2 | 70 |
| HLU-N | 0003 | 0x04000000 | 1GB | SLU-N9 | 2 | 70 |

907

Migration parameters

| Migration count to upper level tier | | Migration count to lower level tier | | Stored time in tier (Hr) | | |
|---|---|---|---|---|---|---|
| Tier2→1 | Tier3→2 | Tier1→2 | Tier2→3 | Tier1 | Tier2 | Tier3 |
| 3 | 2 | 4 | 2 | 30 | 40 | 30 |
| 1 | 1 | 2 | 2 | 20 | 30 | 50 |
| 2 | 1 | 3 | 2 | 30 | 50 | 20 |
| 3 | 2 | 4 | 2 | 30 | 40 | 30 |
| 2 | 1 | 3 | 2 | 30 | 50 | 20 |
| 1 | 1 | 2 | 2 | 20 | 30 | 50 |
| 3 | 2 | 4 | 2 | 30 | 40 | 30 |
| : | : | : | : | : | : | : |
| 3 | 2 | 4 | 2 | 30 | 40 | 30 |
| 1 | 1 | 2 | 2 | 20 | 30 | 50 |
| 1 | 1 | 2 | 2 | 20 | 30 | 50 |

Fig.10

| SLU number | Page number | Data ID | Data real address | |
|---|---|---|---|---|
| | | | Pool number | Pool address |
| SLU-10 | PG-0001 | 0xffff5555 | 001 | 0x0000 |
| | PG-0002 | 0x1000dfdf | 001 | 0x0010 |
| | PG-0003 | 0x55444777 | 001 | 0x0020 |
| | PG-0004 | 0x98567aaa | 001 | 0x0030 |
| | PG-0005 | 0x9763384b | 001 | 0x0040 |
| | : | : | : | : |
| SLU-N0 | PG-0001 | 0x52345555 | 003 | 0x0000 |
| | PG-0002 | 0x48513777 | 003 | 0x0020 |
| | PG-0003 | 0x00001555 | 003 | 0x0020 |
| | PG-0004 | 0x98567aaa | 003 | 0x0030 |
| | PG-0005 | 0x78944724 | 003 | 0x0040 |
| | : | : | : | : |

Fig. 11

| Host LU number (1101) | Virtual storage area number (1101-2) | Start address (1102) | Size (1103) | Page number (1104) | Current Tier (1105) | I/O count (1106) |
|---|---|---|---|---|---|---|
| HLU-1 | 0001 | 0x00000000 | 42MB | PG-0001 | 1 | 89 |
| HLU-1 | 0002 | 0x0000f000 | 42MB | PG-0002 | 3 | 20 |
| HLU-1 | 0003 | 0x000f0000 | 42MB | PG-0003 | 2 | 75 |
| HLU-1 | 0004 | 0x00100000 | 42MB | PG-0004 | 3 | 10 |
| HLU-1 | 0005 | 0x004f0000 | 42MB | PG-0005 | 2 | 70 |
| HLU-1 | 0006 | 0x01000000 | 42MB | PG-0006 | 3 | 35 |
| HLU-1 | 0007 | 0x014f0000 | 42MB | PG-0007 | 3 | 50 |
| : | | : | : | : | | |
| HLU-N | 0001 | 0x00000000 | 42MB | PG-0020 | 1 | 90 |
| HLU-N | 0002 | 0x01000000 | 42MB | PG-0021 | 2 | 70 |
| HLU-N | 0003 | 0x04000000 | 42MB | PG-0022 | 2 | 70 |

1100

| Migration parameters | | | | | | |
|---|---|---|---|---|---|---|
| Migration count to upper level tier (1108) | | Migration count to lower level tier (1109) | | Stored time in tier (Hr) (1110) | | |
| Tier2 →1 | Tier3 →2 | Tier1 →2 | Tier2 →3 | Tier1 | Tier2 | Tier3 |
| 0 | 0 | 0 | 0 | 100 | 0 | 0 |
| 1 | 1 | 2 | 2 | 20 | 30 | 50 |
| 3 | 3 | 4 | 3 | 20 | 50 | 30 |
| 0 | 0 | 1 | 1 | 10 | 10 | 80 |
| 2 | 1 | 3 | 2 | 30 | 50 | 20 |
| 1 | 1 | 2 | 2 | 20 | 30 | 50 |
| 3 | 2 | 4 | 2 | 30 | 40 | 30 |
| : | : | : | : | : | : | : |
| 3 | 2 | 4 | 2 | 30 | 40 | 30 |
| 1 | 1 | 2 | 2 | 20 | 30 | 50 |
| 1 | 1 | 2 | 2 | 20 | 30 | 50 |

| Page number | Data ID | Data real address | |
|---|---|---|---|
| | | Pool number | Pool address |
| PG-0001 | 0xffff5555 | 001 | 0x0000 |
| PG-0002 | 0x1000dfdf | 001 | 0x0010 |
| PG-0003 | 0x55444777 | 001 | 0x0020 |
| PG-0004 | 0x98567aaa | 001 | 0x0030 |
| PG-0005 | 0x9763384b | 001 | 0x0040 |
| : | : | : | : |

Fig. 14
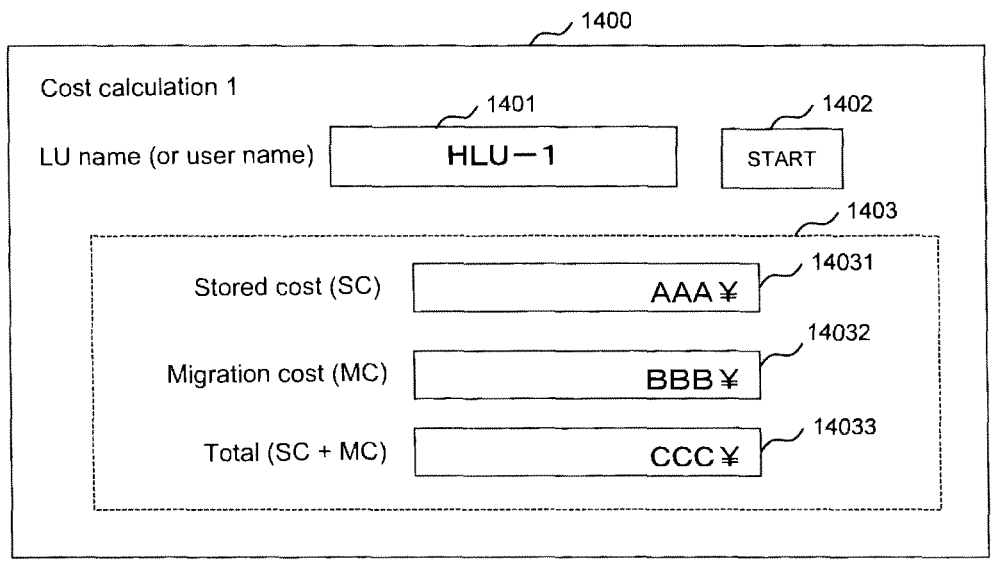
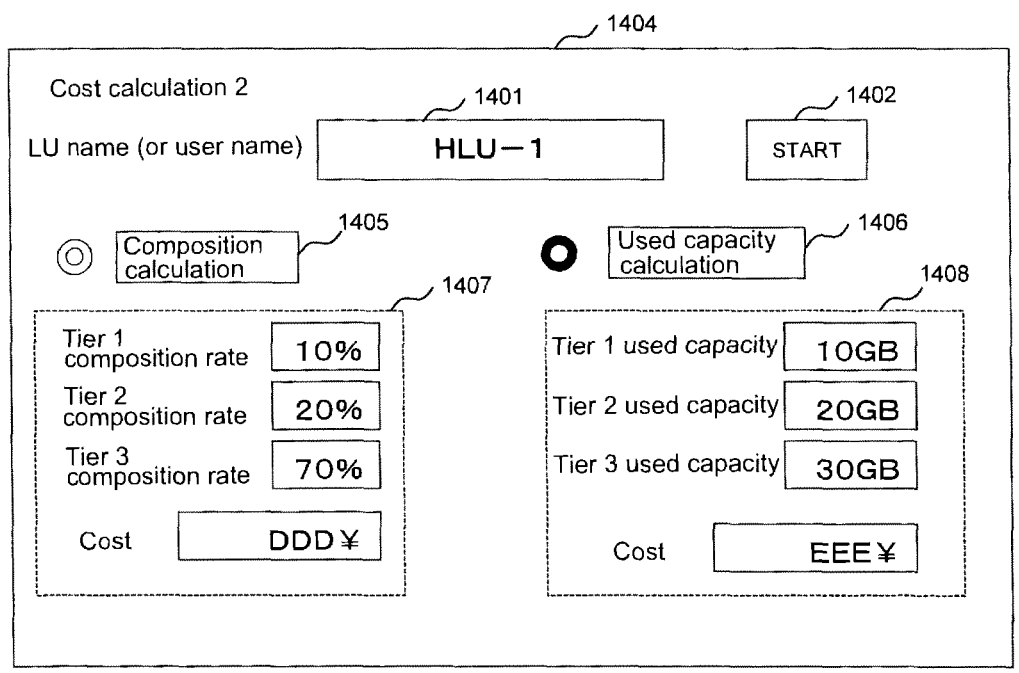

MD1: Migration amount from Tier 1 to Tier 2 (MB)
MD2: Migration amount from Tier 2 to Tier 3 (MB)
MU1: Migration amount from Tier 2 to Tier 1 (MB)
MU2: Migration amount from Tier 3 to Tier 2 (MB)

K1, K2: Adjustment coefficient (<1)
m, m1, m2: cost coefficient per unit migration amount (¥/MB)
n, n1, n2: cost coefficient per unit migration amount (¥/MB)

Fig.19

| HLU number | Virtual storage area number | I/O count (Tier 2 → 1) | I/O count (Tier 3 → 2) |
|---|---|---|---|
| HLU-1 | 0001 | 20:30:05 | 8:5 |
| HLU-1 | 0002 | 40:20 | 34:35:25 |
| HLU-1 | 0003 | 2:3 | 56:45:46 |
| HLU-1 | : | : | : |

The I/O count per migration is shown.
"20:30:05" means that I/O count was "20" for the first time, "30" for the second time and "05" for the third time.

Fig.20

| I/O count (Tier 2 → 1) | Cost | I/O count (Tier 3 → 2) | Cost |
|---|---|---|---|
| 0〜10 | 0 ¥ | 0〜10 | 0 ¥ |
| 11〜30 | FFF ¥ | 11〜30 | HHH ¥ |
| 31〜 | GGG ¥ | 31〜 | JJJ ¥ |

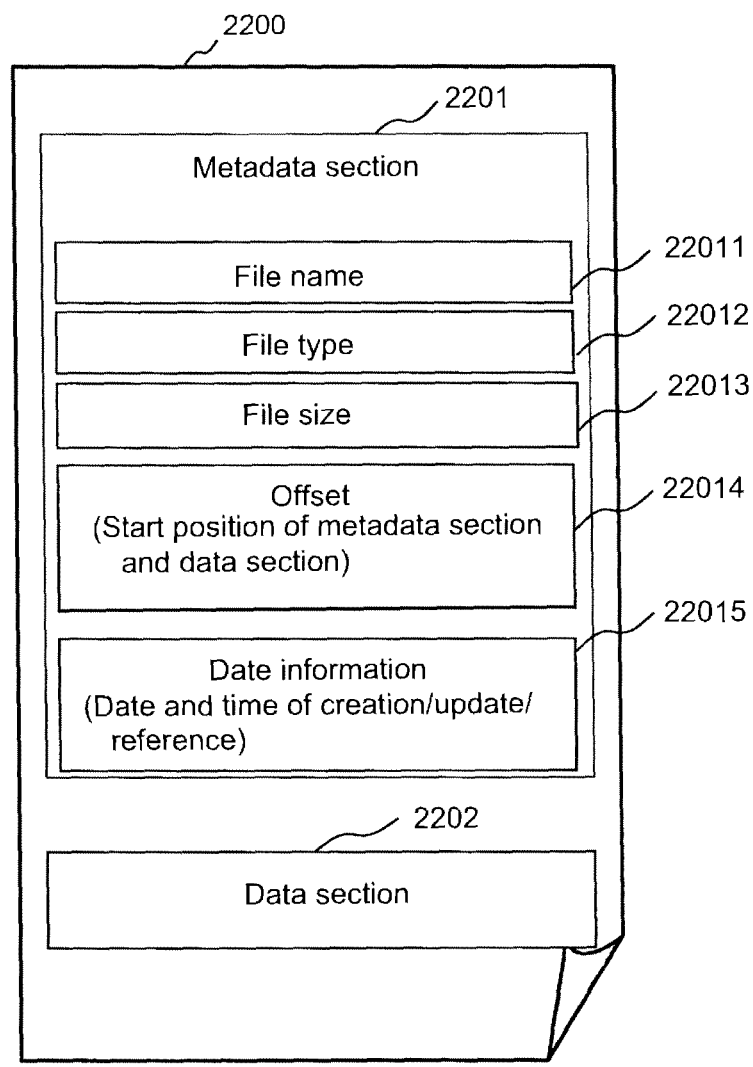

METHOD FOR CALCULATING TIER RELOCATION COST AND STORAGE SYSTEM USING THE SAME

TECHNICAL FIELD

The present invention relates to a system and a method of a tier storage service in an information processing system or an information storage system, and specifically relates to an accounting method for a storage system related to migration of data among tiers in storage areas, tier relocation and optimizing of data location.

BACKGROUND ART

Along with the recent explosive increase of data capacities that business enterprises use, there are increasing demands for a more efficient system for storing and managing data. One method for solving this problem is the integration of storage devices (integration of internal storage devices in the whole enterprise and building a common storage infrastructure environment instead of constructing and maintaining storage systems for respective departments and operations).

Such integration enables highly efficient use of the storage devices, while cutting down and optimizing operation and maintenance costs. Such service is called a private cloud storage service, which is used within enterprises and affiliated business groups. Meter rate accounting based on the capacity of the storage areas of the storage system is applied to charge fees for the use of such storage services including the maintenance, operation and management of the storage system.

In contrast to the private cloud system, there is provided a conventional cloud system. According to the conventional cloud system, clients such as multiple private users and business users share and use storage sources and processing functions of information apparatuses constructed in data centers or the like through the internet. Also according to the conventional cloud system, meter rate accounting based for example on the capacity of the storage areas is applied to charge fees for such services. The arts disclosed in patent literatures 1 and 2 are examples related to such background art.

Patent literature 1 teaches a storage system in which memory devices of storage systems are divided into multiple tiers, wherein high speed devices are assigned to upper level tiers and low speed devices are assigned to lower level tiers, and an optimum tier is selected in response to the status of use of a data by the user so as to store the data in the selected tier. The literature teaches acquiring the time of use and the used capacity of the tier in which the data is stored in order to charge fees.

Further, patent literature 2 discloses a storage accounting system in which a storage service provider (SSP) providing operation and management service of storage devices has a plurality of storages which are divided into multiple sections and provided for service to multiple users, wherein the users pay charges for using the storage system. The accounting system ensures a minimum required data access rate for the user and changes the charged fees based on the demands of the users and the provided data access speed.

CITATION LIST

Patent Literature

PTL 1: Japanese Patent Application Laid-Open Publication No. 2003-140836

PTL 2: Japanese Patent Application Laid-Open Publication No. 2006-113824(US Patent Application Publication No. US 2006/0085329)

SUMMARY OF INVENTION

Technical Problem

According to patent literature 1, fees are charged in response to the status of use of the storage areas, but it does not consider charging fees by calculating the processing costs accompanying the migration of data based on the amount of processes performed (amount of migration). Therefore, the disclosed art had a drawback in that appropriate accounting for storage services could not be performed for both the storage service providers and the users using the storage services. Similarly, the art disclosed in patent literature 2 ensuring a minimum required data access rates for users and changing fees according to the demands of the users and the provided data access speed does not consider calculating and charging fees based on the amount of processes performed (amount of migration). Therefore, similar to patent literature 1, the art in patent literature 2 had a drawback in that appropriate accounting for storage services could not be performed for both the storage service providers and the users using the storage services.

Therefore, the present invention aims at providing a storage system and an appropriate accounting method for the use thereof, the storage system composing multiple tiers formed of memory areas of various memory devices, assigning the memory areas in page units and changing the assigned tiers based on access frequency, wherein the charges accompanying the migration of data among tiers are calculated.

Solution to Problem

In order to solve the problems mentioned above, the present invention provides a storage system composed of a storage device coupled to one or more upper level devices and a management terminal, the storage device comprising a plurality of memory device units assigned to different tiers respectively, a data location management unit for managing location of data in the respective tiers and migration of data among tiers, and a migration amount calculation unit for calculating a data storage time in the respective tiers and a data migration amount when data is migrated among tiers; the management terminal comprising an input unit, an output unit and a cost calculation unit; wherein based on the result calculated via the migration amount calculation unit, the cost calculation unit calculates: (1) a stored cost for storing data in a tier; (2) a first migration cost for migrating data to an upper tier level; and (3) a second migration cost for migrating data to a lower tier level; and at least one of the calculated costs (1) through (3) is displayed on the output unit of the management terminal.

The present invention further provides a method for calculating a tier relocation cost of a storage system composed of a storage device coupled to one or more upper level devices and a management terminal, the storage device comprising a plurality of memory device units assigned to different tiers respectively, a data location management unit for managing location of data in the respective tiers and migration of data among tiers, and a migration amount calculation unit for calculating a data storage time in the respective tiers and a data migration amount when data is migrated among tiers; the management terminal comprising an input unit, an output unit and a cost calculation unit; wherein based on the result calculated via the migration amount calculation unit, the cost calculation unit calculates: (1) a stored cost for storing data in a tier; (2) a first migration cost for migrating data to an upper tier level; and (3) a second migration cost for migrating data to a lower tier level; and at least one of the calculated costs (1) through (3) is displayed on the output unit of the management terminal.

Advantageous Effects of Invention

The present invention enables to charge appropriate fees for using the storage devices for both the storage service providers and users of the storage services.

BRIEF DESCRIPTION OF DRAWINGS

FIG. 7 is a conceptual diagram showing a dynamic tier relocation function.

FIG. 8 is a conceptual diagram illustrating a method for determining an optimum tier according to the dynamic tier relocation function.

FIG. 9 is a view showing one example of a virtual LU address mapping table in LU units.

FIG. 10 is a view showing one example of an information management table in LU units.

FIG. 11 is a view showing one example of the virtual LU address mapping table in page units.

FIG. 12 shows one example of the information management table in page units.

FIG. 14 shows one example of a display screen for displaying costs.

FIG. 19 is a view showing one example of an I/O count management table according to the third embodiment of the present invention.

FIG. 20 is a view showing one example of a cost table of various I/O count ranges according to the third embodiment of the present invention.

FIG. 22 is a view showing one example of a file structure for file unit accesses.

DESCRIPTION OF EMBODIMENTS

Figure 1:
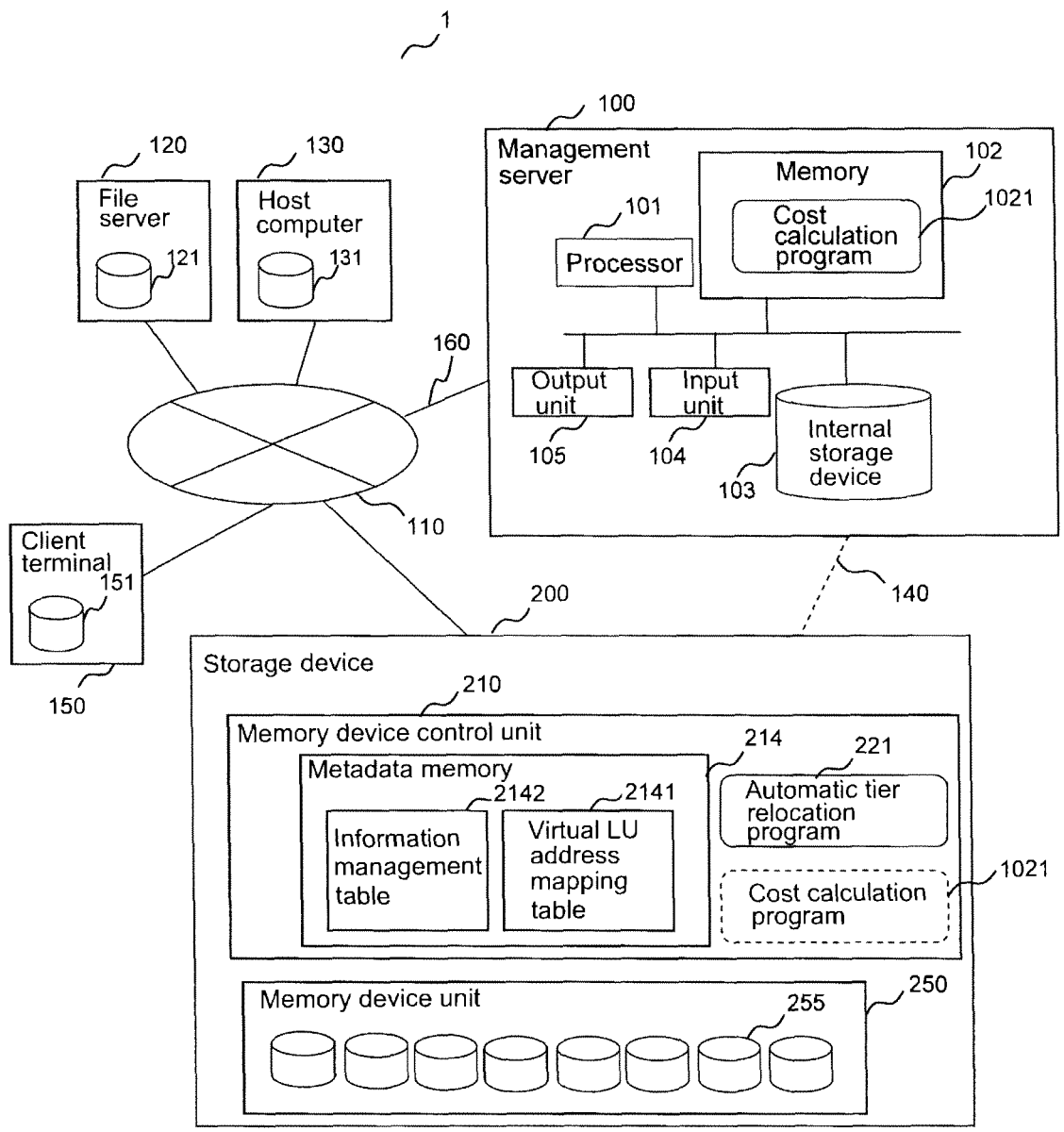
FIG. 1 is a block diagram showing a schematic configuration of a storage system according to a preferred embodiment of the present invention.

Preferred embodiments of the present invention will now be described with reference to the drawings. In the following description, various information are referred to as "management tables" or other similar expressions, but the various information can be expressed via data structures other than tables. Further, the "management table" can also be referred to as "management information" to show that the data does not depend on the data structure.

Further in the present description, there are cases where a "program" is referred to as the subject of various processes. The program is executed by a processor such as an MP (Microprocessor) for performing predetermined processes. Since the processes arbitrarily utilize storage resources (such as memories) and communication interface units (such as communication ports), the subject of the processes can also be the processor. The processor can include the MP and a dedicated hardware. The computer program can be installed in various computers from a program source. The program source can be, for example, a program distribution server or a storage medium.

Furthermore, the respective elements, for example, PDs (Physical Devices) can be identified via numbers, but names or other various identification information can also be used as long as they are identifiable information. Equivalent elements are denoted by the same reference numbers in the drawings and descriptions of the present invention, but the present invention is not restricted to the present examples, and all applicable examples complying with the concept of the present invention are included in the technical range of the present invention. The numbers of respective components can be one or more than one if numbers are not specifically determined.

<Embodiment 1>

(1) Configuration of the Storage System According to the Present Embodiment (1-1) Configuration of the Whole Storage System FIG. 1 is a block diagram showing a schematic view of the whole storage system 1 according to a first preferred embodiment. The storage system 1 has a storage device 200 and a management server 100 connected via a public line 160 and a network 110. Further, the storage device can also be connected directly to the management via a dedicated line 140 (dotted line of FIG. 1) without using the public line 160 and the network 110.

Further, the network 110 can be connected to a file server 120 having an internal storage device 121, a host computer 130 having an internal storage device 131, and a client terminal 150 having an internal storage device 151.

The management server 100 is a server for managing the operation of the storage device 200. The management server 100 is composed of a processor 101 for controlling the whole system, a memory 102, an internal storage device 103 such as an HDD (Hard Disk Drive), an input unit 104 such as a keyboard and a mouse, and an output unit 105 such as a monitor or other display devices and a printer.

The memory 102 stores a cost calculation program 1021 which is a characteristic feature of the present invention. The processor 101 executes the cost calculation program 1021 for calculating a stored cost and a migration cost described in detail later and for displaying the same. Further, the location for installing the present cost calculation program 1021 may be within the management server 100, or within the storage device 200 (area shown by the dotted line within the memory device control unit 210 of FIG. 1), the host computer 130 or the client terminal 150. Of course, the storage device 200, the host computer 130 or the client terminal 150 can also calculate and display the aforementioned costs.

Figure 2:
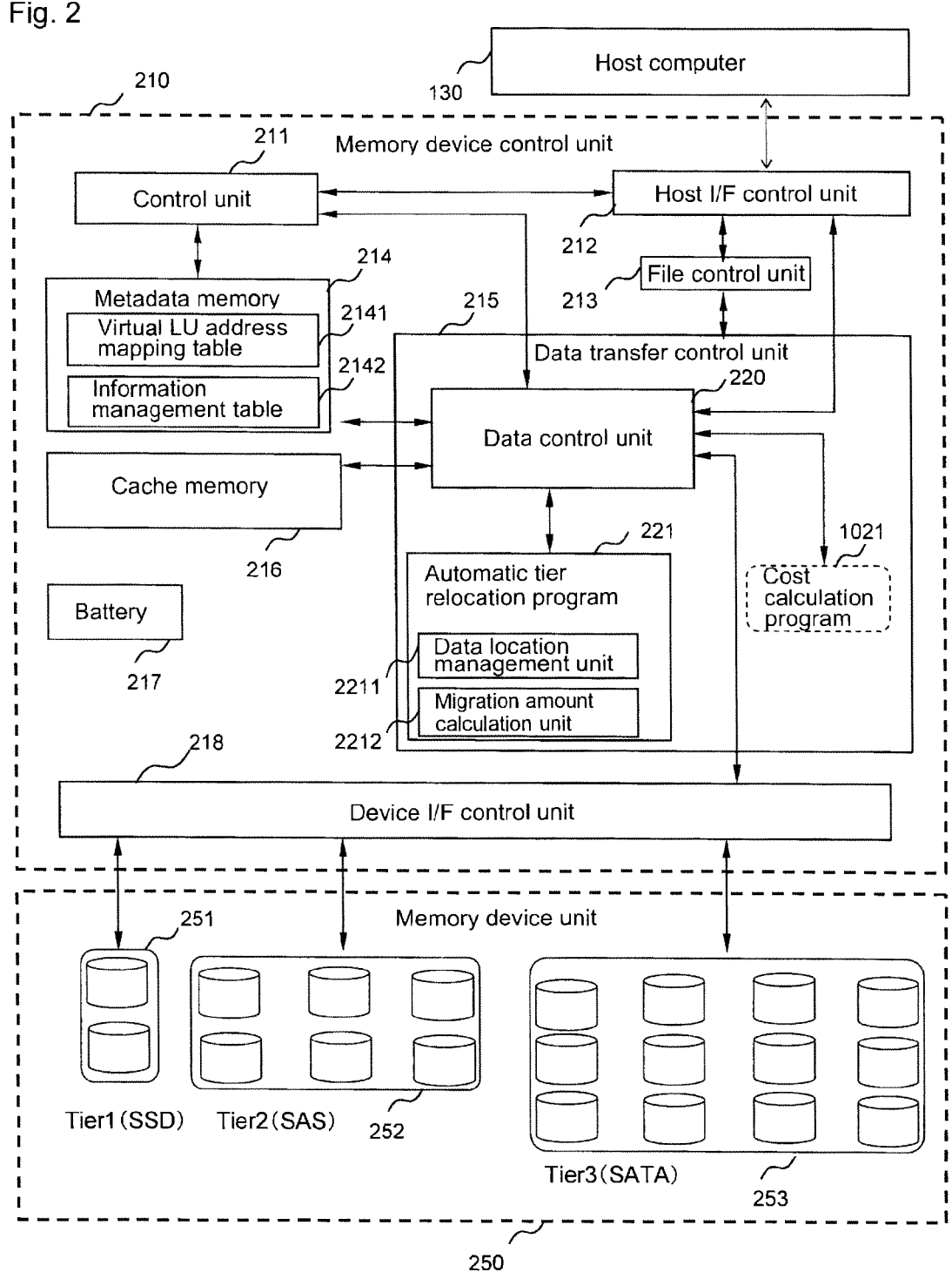
FIG. 2 is a block diagram showing an example of a configuration of a storage device according to a preferred embodiment of the present invention.

The storage device 200 is composed of a memory device control unit 210 and a memory device unit 250. The memory device unit 250 is composed of two or more groups formed of a plurality of memory devices. That is, as shown in FIG. 2, a group called Tier 1 composed of two SSDs (Solid State Drives), a group called Tier 2 composed of six SAS (Serial Attached SCSI) type HDDs and a group called Tier 3 composed of twelve SATA (Serial Advanced Technology Attachment) type HDDs are formed. Further, the memory device control unit 210 is mainly composed of a virtual LU (Logical Unit) address mapping table 2141 and an information management table 2142 stored in a metadata memory 214, and an automatic tier relocation program 221. The details of the storage device 200 will follow.

(1-2) Configuration of the Storage Device

FIG. 2 is a block diagram illustrating an example of a configuration of the storage device 200 according to the preferred example of the present invention. The memory device control unit 210 is composed of a control unit 211, a host I/F control unit 212, a file control unit 213, a metadata memory 214, a data transfer control unit 215, a cache memory 216, a battery 217, a device I/F control unit 218, a data control unit 220, and an automatic tier relocation program 221.

The control unit 211 is composed of one or more microprocessors MPs (or CPUs (Central Processing Units)). The host I/F control unit 212 is an interface for controlling the reception of I/O access request commands or the transmission and reception of data (block format or file format) from higher level devices such as the host computer 130, the management server 100 and the file server 120 or from the client terminal 150.

The metadata memory 214 stores a virtual LU address mapping table 2141 and an information management table 2142. The virtual LU address mapping table 2141 and the information management table 2142 will be described in detail later.

The data transfer control unit 215 is composed of a data control unit 220 and an automatic tier relocation program 221. The data control unit 220 controls the whole data transfer control unit 215 and processes the I/O access requests from the host I/F control unit 212. Moreover, the data control unit 220 controls the device I/F control unit 218 and realizes the transmission and reception of data from/to the memory device unit 250 to/from the cache memory 216 or the host I/F control unit 212.

The automatic tier relocation program 221 is composed of a data location management unit 2211 and a migration amount calculation unit 2212. The data location management unit 2211 controls for example the change of location (assignment) of actual data to respective tiers, and the migration amount calculation unit 2212 computes the amount of migration data that occurs when the data is relocated to respective tiers.

The cache memory 216 is a memory that stores data transmitted and received to/from the data control unit 220, and temporarily stores the write data from the host computer 130 or the address mapping management information which is a mapping information of virtual addresses and real addresses.

A battery 217 is for temporarily supplying power to the storage device 200 when power supply from the exterior is stopped due to power failure or the like. During this power supplying process, the control unit 211 saves the contents of the metadata memory 214 (such as the virtual LU address mapping table 2141 and the information management table 2142) and the contents of the cache memory 216 (such as write data not yet destaged or the mapping management information) which are volatile memories to a memory device 250 or a management server 100 which are nonvolatile memory devices.

The device I/F control unit 218 is for controlling the transmission and reception of commands and data from/to the data transfer control unit 215 to/from the memory device unit 250 composed for example of a Tier 1 level memory device 251, a Tier 2 level memory device 252 and a Tier 3 level memory device 253.

When the host I/F control unit 212 receives a file format data, the file control unit 213 converts the file format data into block unit data. Further, when a read request of file format data is received from the host computer 130, the file control unit 213 converts the data read in units of blocks from the memory device unit 250 into data in units of files.

In other words, the file control unit 213 converts the metadata section 2201 of a file 2200 as shown in FIG. 22 (composed of a file name 22011, a file type 22012, a file size 22013, an offset (which is the start position of the metadata section and the data section) 22014 and a date information (created/updated/reference date and time information) 22015) and a data section 2202 into block units.

Further, the memory device unit 250 is composed for example of a Tier 1 level memory device 251, a Tier 2 level memory device 252 and a Tier 3 level memory device 253. In the present embodiment, the Tier 1 level memory device 251 is composed of SSDs (Solid State Drives), the Tier 2 level memory device 252 is composed of SAS (Serial Attached SCSI) disks and the Tier 3 level memory device 253 is composed of SATA (Serial Advanced Technology Attachment) disks, but they are not restricted to such examples.

An SSD is a memory device utilizing, for example, a flash memory which is a semiconductor memory, having a function to emulate the function of an HDD and having a similar interface as the HDD. The cost per capacity of the SSD is more expensive compared to the HDD, but the SSD has a better read performance during random access. Therefore, if frequently accessed OS (Operating Systems), AP (Application Programs) and data are stored in the SSD, the throughput of the accesses can be improved. Moreover, the SSD does not have any mechanically driven sections such as motors or heads. Therefore, it is free from failures, noise and vibration that mechanically driven sections tend to suffer.

A SAS disk and a SATA disk are both HDDs having serial interfaces for connection with computers and the like. The SAS disk is a successor device of the widely adopted SCSI, and has superior data transmission performance and reliability.

The SATA disk is a successor device of IDE (Integrated Drive Electronics) and ATA (Advanced Technology Attachment) which have been used widely due to their high cost performances. Generally, the SATA disks can be manufactured easily and at a low cost compared to SAS disks, so they can be applied to inexpensive large capacity systems. For example, the SATA disks are used in cost performance-oriented products such as servers having a relatively low access frequency such as file sharing servers and Web servers, or PCs and HDD recorders.

On the other hand, the SAS disks tend to be adopted in systems requiring high performance and high reliability such as large-scale core operation servers and data base servers. Focusing on the performance, the SSD has an access performance which is approximately double the SAS (15000 rpm (roots per minute)) disk, and for random reading, approximately four times the SAS.

The SATA (7200 rpm) has a rotation speed which is approximately ½ the SAS disk, and the access performance is also approximately ½. Therefore, from the viewpoint of performance, SSD is superior to SAS which is superior to SATA, but from the viewpoint of cost, SATA is superior to SAS which is superior to SSD.

The present invention focuses on the characteristic features of the various memory devices from both viewpoints of performance and cost, and to the migration of data among the respective memory devices, so as to provide an appropriate charging method for using the storage system by calculating fees accompanying the data migration among tiers, and a storage system thereof.

(1-3) Mapping of Multiple Virtual Pages and Real Pages (Page Pools)

Figure 3:
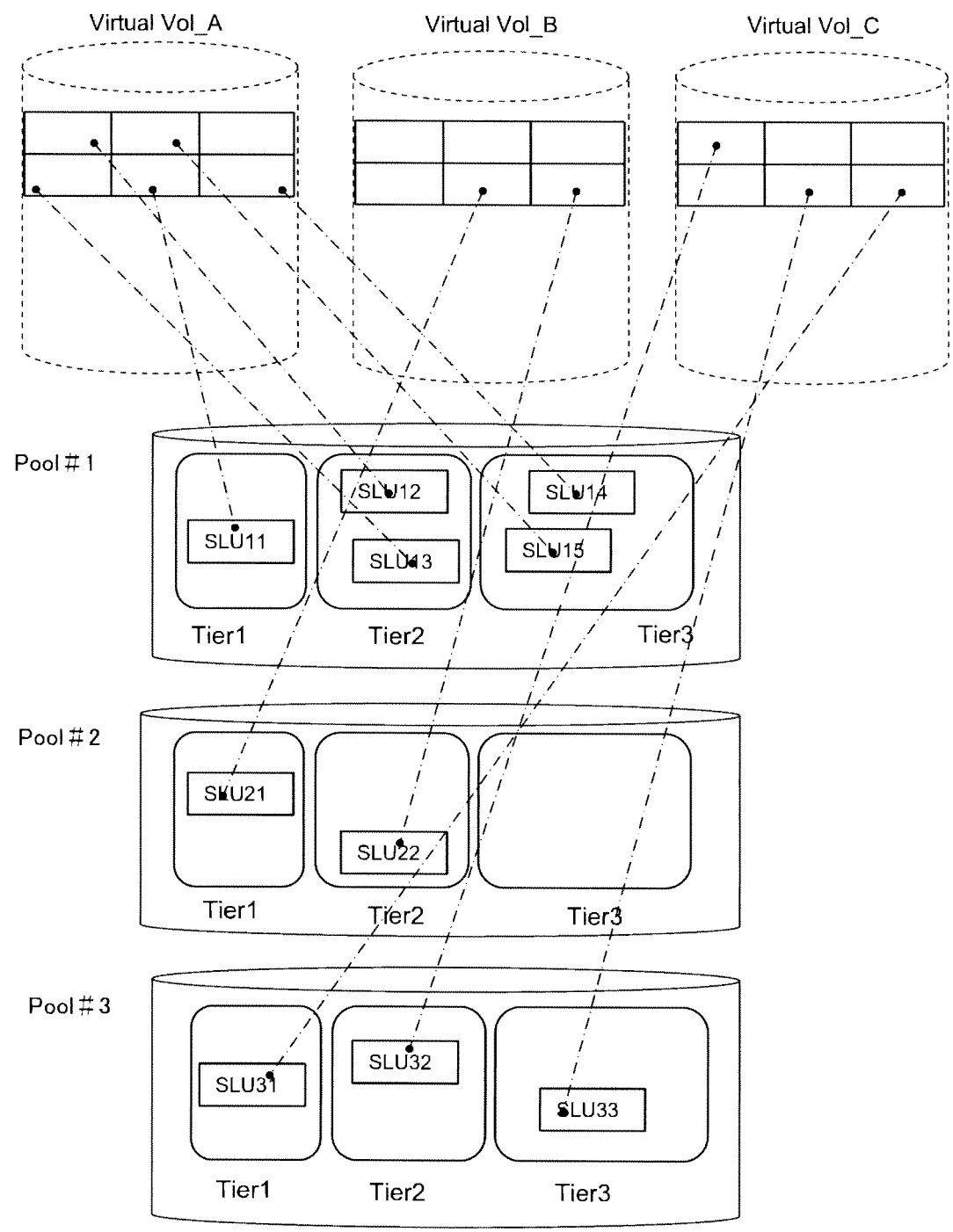
FIG. 3 is a view showing one example of mapping (correspondence relationship) of virtual pages and real pages assigned to a written area.
Figure 4:
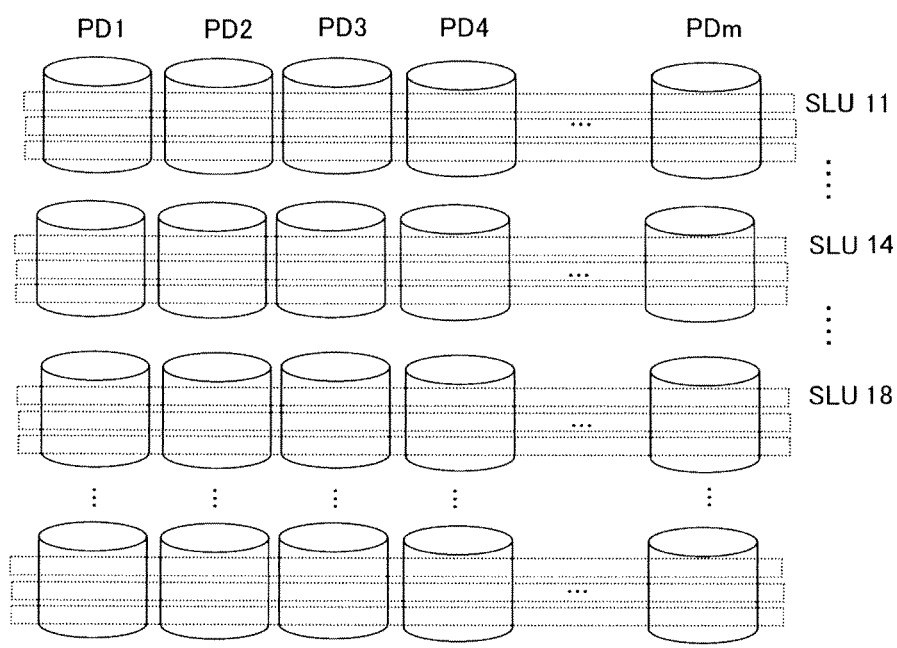
FIG. 4 is a view showing one example of mapping of virtual pages and real pages assigned to a written area.

FIGS. 3 and 4 show an example of mapping virtual storage areas in a virtual volume and physical storage areas (SLUs or pages) assigned to written areas. The mapping is determined by the contents of the virtual LU address mapping table 2141 and the information management table 2142.

A virtual Vol_A, a virtual Vol_B and a virtual Vol_C which are logical volumes recognized by the host computer 130 (hereinafter referred to as host LU or HLU) are shown via dotted lines on the upper area of FIG. 3. A host logical volume has the same meaning as a virtual volume. The memory device control unit 210 provides the virtual volumes to the host computer. Further, a plurality of pools and SLUs (sub LUs) which are physical storage areas within the pools are shown via solid lines on the lower area of FIG. 3.

The relationship of the virtual storage areas within the HLU and SLU is shown via dashed-dotted lines. The physical storage areas (SLUs) are assigned in SLU units from the pools to the respective virtual storage areas in FIG. 3, but it is also possible to assign the physical storage areas (pages) in page units.

The respective pools on the lower area of the drawing having pool numbers 1 through 3 (Pool #1, Pool #2 and Pool #3 of FIG. 3) are respectively composed of the Tier 1 level memory device 251, the Tier 2 level memory device 252 and the Tier 3 level memory device 253.

The SLUs which are physical storage areas within the pool are associated with virtual storage areas of the HLU via the virtual LU address mapping table 2141. The HLU is composed of a plurality of associated SLUs. No SLU is assigned from the pool to the area within the HLU having no data written thereto.

FIG. 4 shows an example of the correspondence relationship of the SLUs and physical storage devices. One or more stripes are formed astride physical disks PD1 through PDm. The respective stripes correspond to each of the aforementioned SLUs (SLU1 through SLUN).

(1-4) Concept of Dynamic Real Area Assignment Function

Figure 5:
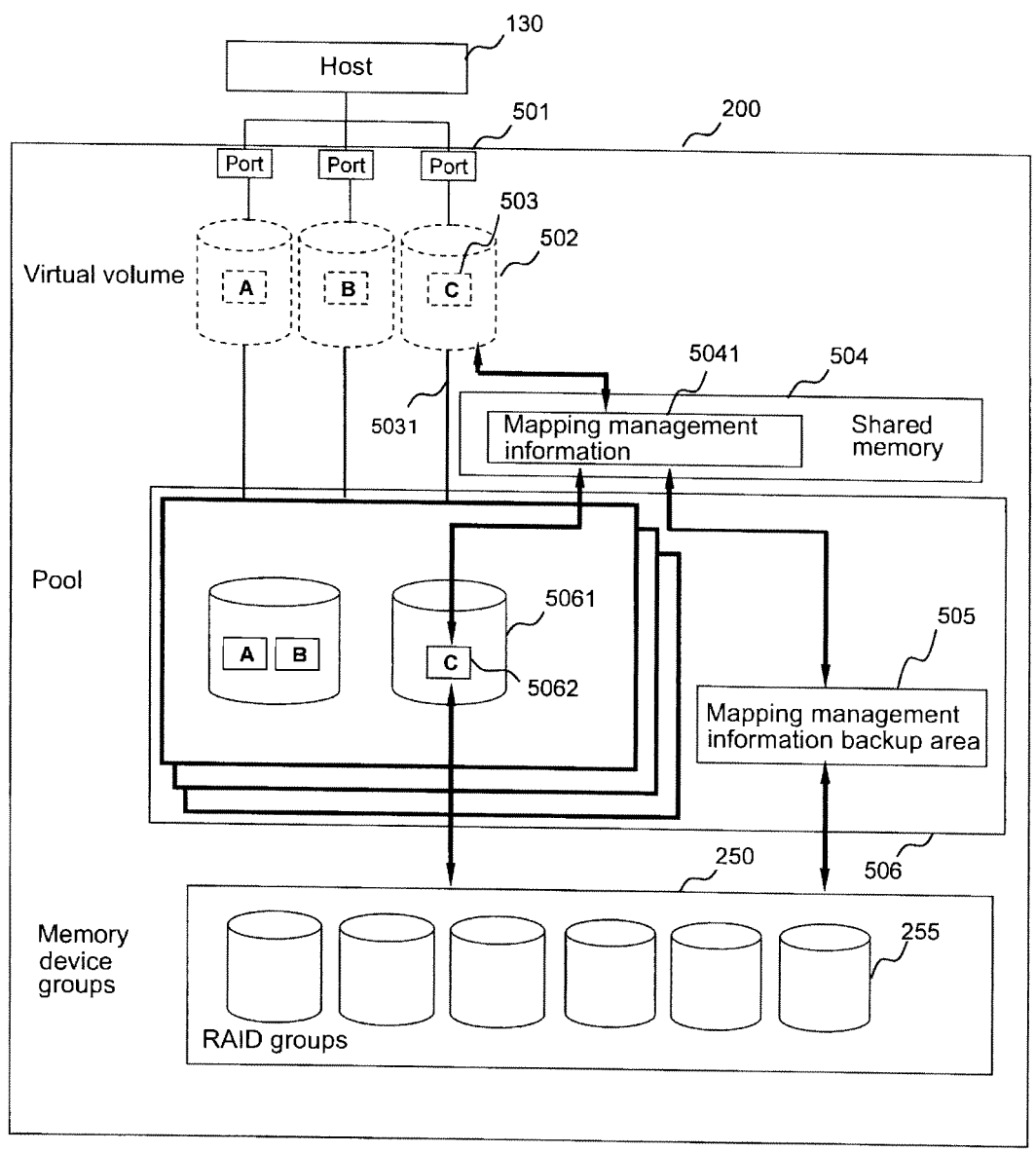
FIG. 5 is a conceptual diagram showing a dynamic real area assignment function for storage virtualization.
Figure 6:
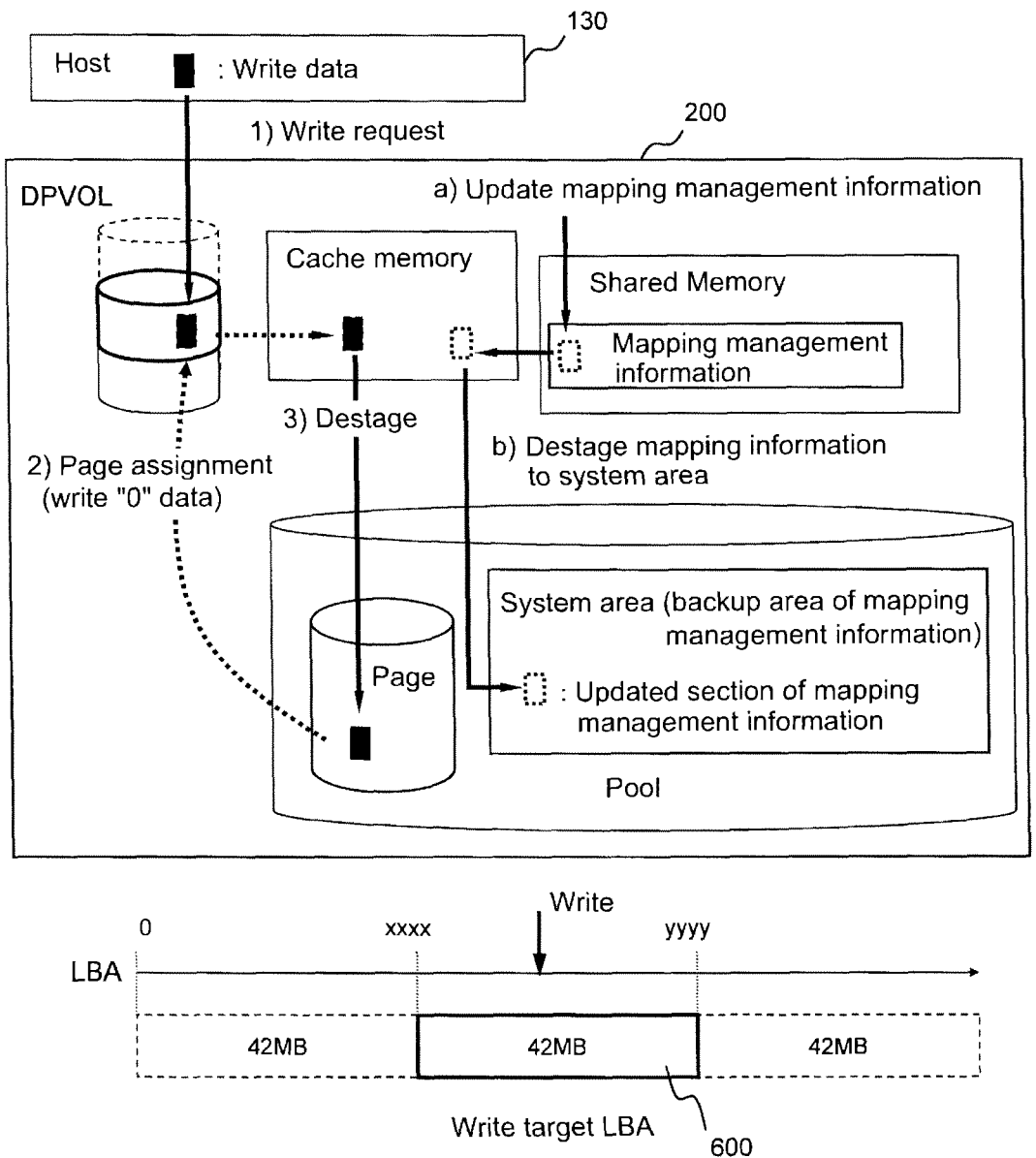
FIG. 6 is a conceptual diagram showing a dynamic real area assignment function for storage virtualization.

FIGS. 5 and 6 are conceptual diagrams of a dynamic real area assignment function referred to as thin provisioning or dynamic provisioning. The dynamic real area assignment function assigns a virtual volume having a greater capacity than the physical capacity to a host computer and the like, and assigns necessary physical storage areas in response to a data write request.

In other words, the memory device control unit 210 of the storage device 200 provides a plurality of virtual volumes to the host computer 130 and manages pools composed of a plurality of tiers. As for the area not having a real area (physical storage area) assigned thereto out of the virtual areas of the virtual volumes, the memory device control unit 210 assigns a real area (physical storage area) to the virtual data from the pool when a write command is received from a host computer 130.

In the present invention, the assigned units are either in SLU units (1 GB) composed of multiple pages (for example, 42 MB/page capacity) or page units. However, the assigned units are not limited thereto. It becomes possible via settings which tier is initially assigned. For example, it is possible to constantly initially assign pages from tier level 1, and to relocate the pages to the optimum tiers according to the status of use via the dynamic tier relocation function described later.

The actual operation will be described with reference to FIGS. 5 and 6.

(DP1) Write Request

A write request of data called data "C" to a virtual storage area (also called a virtual SLU or virtual page) 503 of a host virtual volume HLU 502 (DPVOL (Dynamic Provisioning Volume) of FIG. 6) is sent from the host computer 130 via a port 501 of the storage device 200 to a host I/F control unit 212 (FIG. 2). The host I/F control unit 212 sends the received write request to the data control unit 220 of the data transfer control unit 215. The data control unit 220 having received the write request stores the data "C" temporarily in the cache memory 216.

(DP2) Assignment of Pages

Next, if an SLU (or page) which is a physical storage area is not assigned to the virtual storage area which is the data storage destination of the write request, the data control unit 220 assigns an SLU (or page) 5062 of a pool volume 5061 to a virtual storage area 503 of the host virtual volume HLU 502. Simultaneously, the data control unit 220 updates the virtual LU address mapping table 2141 and the information management table 2142 constituting the mapping management information 5041 in the shared memory 504 (composed of the metadata memory 214 and the like).

In other words, a mapping 5031 of a virtual storage area 503 of the host virtual volume HLU 502 and an SLU (or page) which is the physical storage area 5062 of the pool volume 5061 (virtual page—real page mapping line) of pool 506 is constructed. Then, the updated mapping management information 5041 is written into the cache memory 216. Thereby, it becomes possible to manage the location and the pool volume in which the real data of the virtual volume is stored.

If there is a write request to the address range 600 (between LBA (Logical Block Address)_xxxx and LBA_yyyy) having no free space allocated thereto as shown in the bottom area of FIG. 6, 42 MB which corresponds to a capacity of a single page is allocated in the pool as free area, and an SLU (or page) is assigned.

(DP3) Destage

Finally, the data control unit 220 executes destaging of write data (operation for writing the data existing only in the cache memory 216 to a physical device 255 of the memory device 250) at a certain timing (such as via certain cycles or during a process wait time when no process via the data control unit 220 exists). At the same time, the mapping management information 5041 also executes destaging to a system area which is the backup area of the mapping management information (mapping management information backup area 505). The physical device 255 of the memory device 250 is also assigned to this system area.

(1-5) Concept of Automatic Tier Relocation Function

FIG. 7 is a conceptual diagram of a dynamic tier relocation function called dynamic tiering. The dynamic tiering function automatically locates (relocates) a physical storage area assigned to a virtual storage area having a high I/O load to a higher tier SLU (or page) and a physical storage area assigned to a virtual storage area having a low I/O load to a lower tier SLU (or page).

This function realizes effective usage of volume performance and reduction of costs at the same time. Actually, the frequency of accesses (write and read accesses) is measured for each SLU (or page) assigned to a virtual storage area of the virtual volume. Based on the access frequency, the SLU (or page) assigned to the virtual storage area is changed dynamically to a different tier level (hereinafter simply referred to as tier). Further, it is also possible to measure the frequency of accesses to the virtual storage area within the virtual volume.

For example, it is assumed that the access frequency a is greater than threshold frequency A, threshold frequency A is greater than or equal to access frequency b which is greater than threshold frequency B, and threshold frequency B is greater than or equal to access frequency c. First, the data location management unit 2211 of the automatic tier relocation program 221 measures an access frequency 1 per a certain period of time from the host computer 130 to a virtual storage area to which the SLU (or a page) of tier 1 is assigned. If the measured access frequency 1 is not greater than threshold frequency A and exceeds threshold frequency B, the data in the SLU (or page) of Tier 1 is moved to the SLU (or page) of Tier 2. Simultaneously, the mapping management information is updated and the SLU (or page) of Tier 2 is assigned to the virtual storage area of the host computer. Similarly, the access frequency 2 to the virtual storage area having the SLU (or page) of Tier 2 assigned thereto is measured, and when the frequency is greater than the threshold frequency A, the data in the SLU (or page) of Tier 2 is migrated to the SLU (or page) of Tier 1 and the SLU (or page) of Tier 1 is assigned to a virtual storage area.

A more actual operation of the dynamic tiering function is described with reference to FIG. 7.

(DT1) Write Request and Assignment of New SLU/Page (SLU/Page Means SLU or Page)

The host computer 130 issues a write request 701 to a virtual storage area 503 of the host virtual volume HLU 502. The write request 701 is transmitted via a host I/F control unit 212 of the storage device 200 to the data transfer control unit 215. The data control unit 220 executes the following process 702 in response to the write request sent to the data transfer control unit 215.

(a1) The address of a cache memory 216 for writing the write request data and management information to the cache memory 216 is calculated.

(a2) The entries (start address, data ID, data real address and the like) of the virtual LU address mapping table 2141 and the information management table 2142 as mapping management information 5041 are added.

(a3) The data and the mapping information are stored in the address of the cache memory 216 computed in (a1).

(a4) Next, the area of the SLU number (page number) corresponding to the write data size is assigned from the pool of Tier 1. At this time, the data location management unit 2211 of the automatic tier relocation program 221 manages the mapping of the tier level (storage tier) to which the data area 7023 is assigned and the device logical number SLU number/page number.

(DT2) Measurement of I/O Access Frequency

After newly assigning an SLU or page, the data location management unit 2211 counts (monitoring 703) the number of I/O accesses (write or read accesses) from the host computer 130 to the SLU or page which is the assigned area, and creates a SLU/page monitoring information 7031.

(DT3) Determination of Optimum Tier and Relocation of Tier

The optimum tier (memory device) for storing data is determined (optimum tier determination 704) using the created SLU/page monitor information and a "tier (memory device assignment area)—I/O access load curve" of FIG. 8. The present process can either be performed periodically or at designated hours. Data is migrated to the SLU (or page) of the determined optimum tier, and the virtual storage area 503 is mapped to the SLU (or page) 7024 after migration (update of mapping and relocation 705). FIG. 8 is a conceptual diagram of the method for determining the optimum tier for dynamic tiering. The concept will be described below.

The storage devices can be classified into the following three types from the viewpoint of access frequency: "on-line" which is accessed highly frequently and must provide high speed and high frequency; "near-line" which is not accessed frequently but can be accessed whenever necessary; and "off-line" which is rarely accessed but must realize long-term storage of data.

The "on-line" storage devices have mainly assigned thereto a high load area (high speed device assignment area) 801 (SSD 251 of Tier 1) and middle load area (middle speed device assignment area) 802 (SAS 252 of Tier 2) having a high availability but requires high costs. The "off-line" storage devices have mainly assigned thereto a noload area (ultraslow device assignment area) 804 (tape drives which are Tier 4 memory devices 805) which requires low costs but cannot be used instantly. The "near-line" storage devices have assigned thereto a low load area (low speed device assignment area) 803 (SATA 253 of Tier 3) suitable for storing data having low frequency of use but must be used instantly (such as e-mails, medical data, image and audio data, or backup).

If, for example, the I/O access count does not fall within a range 801 for assigning data to Tier 1 (SSD) 251 (the I/O access count does not exceed L2) but falls within a range 802 exceeding L2 but not exceeding L1, the tier to which the data area 7023 is assigned is changed from Tier 1 (SSD) to Tier 2 (SAS). During this changing process, at first, the migration amount calculation unit 2212 of the automatic tier relocation program 221 computes the capacity of the data to be migrated and the migration time. After calculation, the data is migrated to the optimum tier (memory device) and the relationship between the host virtual logical volume and the page is updated.

(1-6) Virtual LU Address Mapping Table and Information Management Table (SLU Units)

FIG. 9 shows a view illustrating one example of the virtual LU address mapping table of a case where physical storage areas are assigned in SLU units from the pool to the virtual storage area of the virtual logical volume. The virtual LU address mapping table 900 manages the virtual storage area of the virtual logical volume HLU of the host computer 130 via a virtual storage area number 901-2, a start address 902 and a size 903. Further, the table manages the SLU number 904 and the tier 905 thereof currently assigned to the virtual storage area. The table further manages an I/O count 906 to the SLU which is the physical storage area assigned to the virtual storage area. The I/O count 906 is the total counted number of I/O accesses to the SLU. The count may be reset every time dynamic tiering is performed. The I/O count 906 may also be the number of I/O accesses per unit time (such as the number of accesses per hour) or the increment of the number of I/O accesses. In such case, the number of I/O accesses 906 should be divided by the data stored time (not shown) in the currently stored tier. The I/O count may also be the number of I/O to the virtual storage area. The table further manages the migration parameter 907 per virtual storage area. The migration parameter 907 is composed of a number of migration 908 to the upper level tier, a number of migration 909 to the lower level tier, and a stored time 910 within the respective tiers. The number of migration 908 to the upper level tier includes the number of migration of data from Tier 2 to Tier 1 and the number of migration of data from Tier 3 to Tier 2. Obviously, the number can include the number of migration of data from Tier 3 to Tier 1. The number of migration 909 to the lower level tier includes the number of migration of data from Tier 1 to Tier 2 and the number of migration of data from Tier 2 to Tier 3. Obviously, the number can include the number of migration of data from Tier 1 to Tier 3. Further, the tier storage time (Hr) refers to the time during which the SLU of the respective tiers (Tier levels 1, 2 and 3) are assigned to the respective virtual storage areas (the time during which data is stored in storage devices of the respective tier levels).

FIG. 9 shows the mapping of the virtual storage area of the host LU and the SLU illustrated in FIG. 3. The host LU number (HLU number) 901 is an identifier for identifying the host LU, the virtual storage area number 901-2 is an identifier for identifying the virtual storage area, and the start address 902 is the initial address of the respective virtual storage areas of the HLU. The size 903 shows the data capacity of the respective virtual storage areas. The SLU number 904 is an identifier for identifying the SLU which is the physical storage area within a pool.

FIG. 10 is a view showing one example of the information management table when assigning physical storage areas in SLU units from the pools to virtual storage areas of the virtual logical volumes. The information management table 1000 manages the mapping of the SLUs of respective pools shown on the lower area of FIG. 3 and the physical disks (from PD1 to PDm) of FIG. 4.

The information management table 1000 is composed of an SLU number 1001, a page number 1002, a data ID (Identifier) 1003 and a data real address 1004. Further, the data real address 1004 is composed of a pool number 10041 and a pool address 10042.

In other words, the information management table 1000 manages the page number 1001 included in the SLU, the data ID (Identifier) 1003 and the data real address 1004 for each SLU number. The page number 1002 is a number for identifying the respective virtual pools, and the data ID 1003 is an identifier for identifying the respective data.

The pool number 10041 is a number for managing the structure of SLUs, for example, if a single SLU is composed astride a plurality of virtual pools. The pool number 10041 enables to change the storage location of specific data arbitrarily via small units. The pool address 10042 shows the address of respective virtual pools.

(1-7) Virtual LU Address Mapping Table and Information Management Table (Page Units)

FIG. 11 shows one example of the virtual LU address mapping table when assigning physical areas in page units to the virtual storage areas of the virtual volume. The virtual LU address mapping table 1100 manages the respective virtual storage areas of the virtual logical volume HLU of the host computer 130 via a virtual storage area number 1101-2, a start address 1102 and a size 1103. The table further manages a page number 1104 and the tier 1105 thereof currently assigned to the virtual storage area. Further, the table manages an I/O count 1106 of the page which is the physical storage area assigned to the virtual storage area. The I/O count 1106 is the total counted number of I/O accesses to the page. The count may be reset every time dynamic tiering is performed. The I/O count 1106 may also be the number of I/O accesses per unit time (such as the number of accesses per hour) or the increment of the number of I/O accesses. In such case, the number of I/O accesses 1106 should be divided by the data stored time (not shown) in the currently stored tier. The I/O count may also be the number of I/O to the virtual storage area. The virtual LU address mapping table 1100 further manages the migration parameter 1107 per virtual storage area. The migration parameter 1107 is composed of a number of migration 1108 to the upper level tier, a number of migration 1109 to the lower level tier, and a stored time 1110 within the respective tiers. The number of migration 1108 to the upper level tier includes the number of migration of data from Tier 2 to Tier 1 and the number of migration of data from Tier 3 to Tier 2. Obviously, the number can include the number of migration of data from Tier 3 to Tier 1. The number of migration 1109 to the lower level tier includes the number of migration of data from Tier 1 to Tier 2 and the number of migration of data from Tier 2 to Tier 3. Obviously, the number can include the number of migration of data from Tier 1 to Tier 3. Further, the tier stored time (Hr) 1110 refers to the time during which the pages of the respective tiers (Tier levels 1, 2 and 3) are assigned to the respective virtual storage areas (the time during which data is stored in storage devices of the respective tier levels).

FIG. 11 shows the mapping of the virtual storage areas of the host LU and the pages which are the physical storage areas illustrated in FIG. 3. The host LU number (HLU number) 1101 is an identifier for identifying the host LU, and the start address 1102 is the initial address of the respective virtual storage areas of the HLU. The size 1103 shows the data capacity of the respective virtual storage areas. The page number 1104 is an identifier for identifying the page which is the physical storage area within a pool.

The difference between FIG. 9 and FIG. 11 is that the physical storage area within the pool is assigned to the virtual storage area of the host LU either in SLU units which are assemblies of multiple pages or in page units.

FIG. 12 illustrates one example of the information management table when assigning the physical storage areas within the pool in page units to the virtual volume. The information management table 1200 is composed of a page number 1202, a data ID (Identifier) 1203 and a data real address 1204.

The data real address 1204 is composed of a pool number 12041 and a pool address 12042.

In other words, the information management table 1200 manages the data ID (Identifier) 1203 and the data real address 1204 via page number units 1201. The meaning and operation of the respective elements of FIG. 12 are the same as FIG. 10.

(1-8) Actual Processes for Calculating Costs

Figure 13:
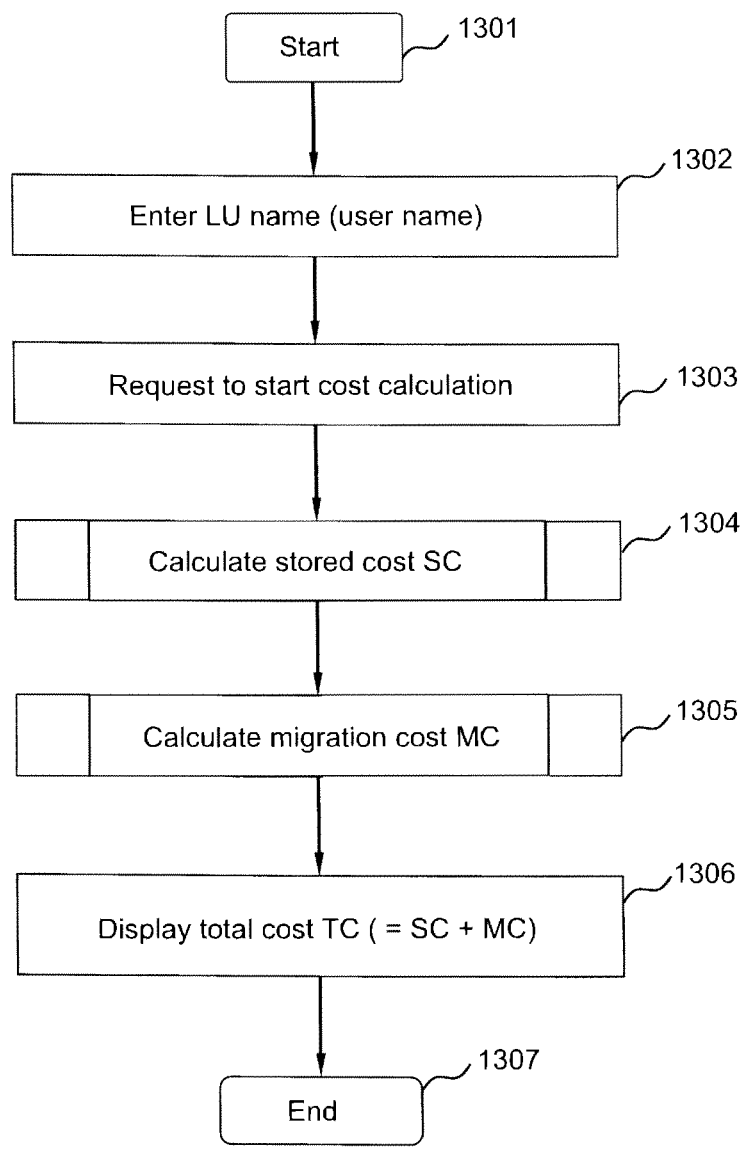
FIG. 13 is a flowchart showing the processes of cost calculation and cost display.

FIG. 13 is a flowchart showing the process for calculating costs and displaying costs according to the cost calculation program 1021 operated via the management server 100. FIG. 14 is a view showing one example of the display screen (output unit 105) of the management server 100.

First, the processor 101 executes the cost calculation program 1021 in the memory 102. After execution, the management screen 1400 of FIG. 14 is displayed, through which one can enter the LU name or user name using a keyboard or a mouse of the input unit 104 to the entry area 1401 (step 1302).

Next, a start button 1402 is selected to instruct the cost calculation program 1021 to start the cost calculation (step 1303). When a user name is entered, the user specified via the user name selects the HLU to be used and executes the following processes. The cost calculation program 1021 calculates the stored costs of the respective virtual storage areas within the HLU based on the stored time during which data is stored in the respective tiers (data retention time) in step 1304, and the calculated sum is set as the overall stored cost SC (Stored Cost). Then, the calculated stored cost SC is displayed on a display area 14031 of a cost display range 1403 of the management screen 1400 (step 1304).

Next, the cost calculation program 1021 calculates the migration cost per virtual storage area in step 1305 based on the migration information for migrating data (migration source tier level, migration destination tier level, migration data amount and migration time), and the calculated sum is set as the overall migration cost MC (Migration Cost). Thereafter, the migration cost MC is displayed on the display area 14032 (step 1305).

Lastly, the cost calculation program 1021 calculates a total cost TC (Total Cost) which is the sum of the stored cost SC and the migration cost MC (SC+MC), and displays the total cost TC on a display area 14033 of a cost display range 1403 of the management screen 1400 (step 1306) to end the process.

(1-8-1) Calculation of Stored Cost (Step 1304)

Figure 15:
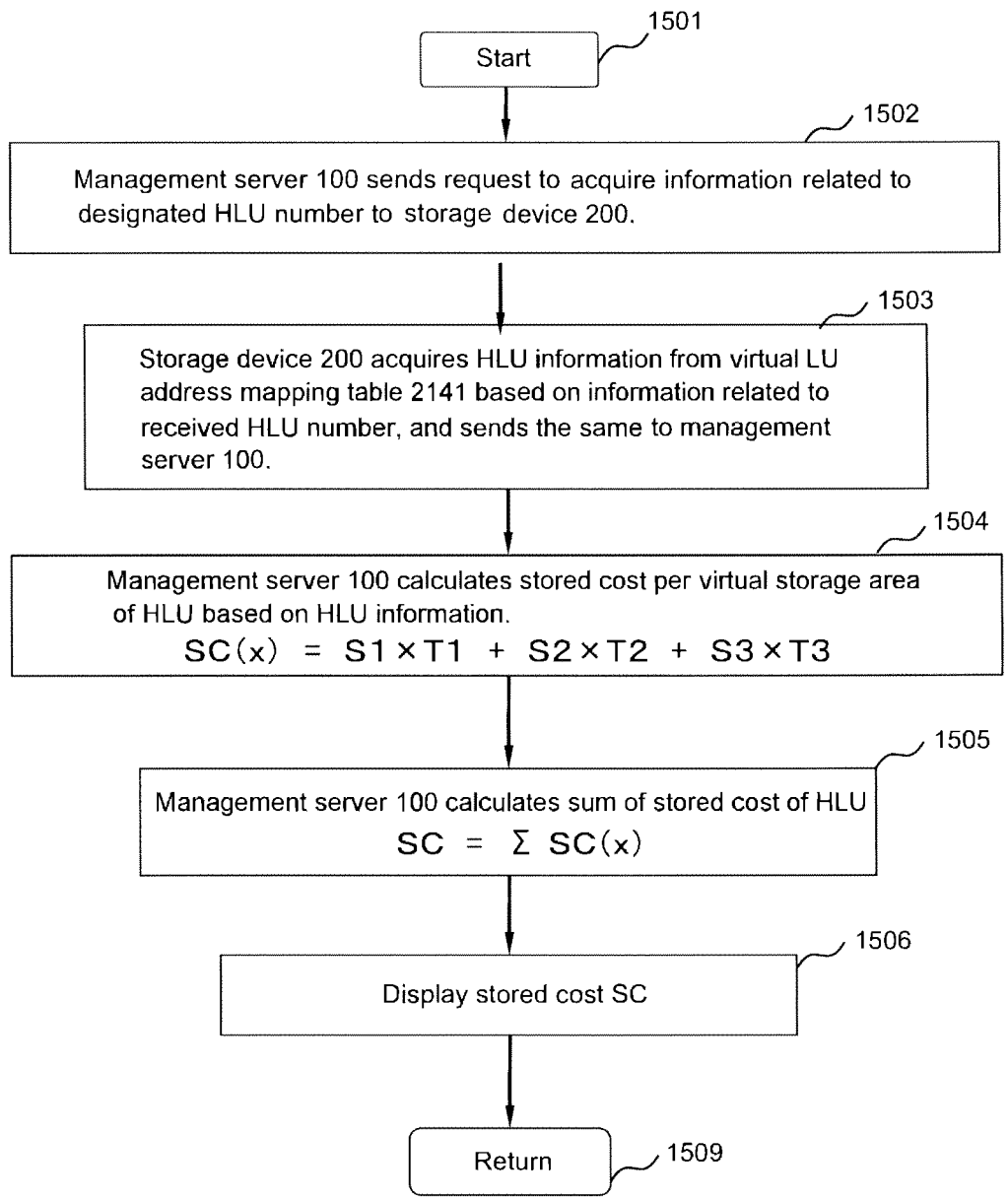
FIG. 15 is a flowchart showing a process for calculating stored costs.

FIG. 15 is a flowchart showing the process for calculating the stored cost SC. The actual processes for calculating the stored cost will be described with reference to FIG. 15 and FIG. 2. First, the cost calculation program 1021 of the management server 100 sends a request to acquire information related to the designated HLU number to the storage device 200 (step 1502).

Based on the received HLU number, the storage device 200 acquires the migration parameters (number of migration to upper level tiers, number of migration to lower level tiers, tier storage time) of the respective virtual storage areas of the host LU designated by HLU numbers, and sends the same to the management server 100 (step 1503). By sending only the migration parameters corresponding to the designated HLU number to the management server 100, the amount of information to be transmitted can be reduced. The transmitted information is hereafter referred to as HLU information. The cost calculation program 1021 calculates the stored cost SC($x$) ($x$ being a virtual storage area number) per virtual storage area based on the HLU information received from the storage device 200 via the following expression 1 (step 1504).

$$SC(x) = S1 \times T1 + S2 \times T2 + S3 \times T3 \qquad \text{Expression 1}$$

S1: Stored cost per unit time in Tier 1 corresponding to SLU/page size (yen/Hr)

S2: Stored cost per unit time in Tier 2 corresponding to SLU/page size (yen/Hr)

S3: Stored cost per unit time in Tier 3 corresponding to SLU/page size (yen/Hr)

T1: Stored time in Tier 1 (Hr)

T2: Stored time in Tier 2 (Hr)

T3: Stored time in Tier 3 (Hr)

Next, the cost calculation program 1021 calculates the sum of the stored cost SC per virtual storage area using the following expression 2 (step 1505). In other words, the cost calculation program calculates the sum of the stored cost acquired per virtual storage area of the HLU.

[Math. 1]

$$SC = \Sigma SC(x) \, (x\text{:virtual storage area number}) \qquad \text{Expression 2}$$

Lastly, the stored cost SC is displayed on a display area 14031 of the cost display area 1403 of the management screen 1400 (step 1506) and the process is ended (step 1509).

In the present embodiment, the stored time was described as "Hr (hour)", but other time units such as "minute" or "day" can be used. Further, the display of stored cost may show not only the total stored cost SC but also the stored costs of the respective Tiers (such as the stored cost S1×T1 of Tier 1).

(1-8-2) Calculation of Migration Cost (Step 1305)

Figure 16:
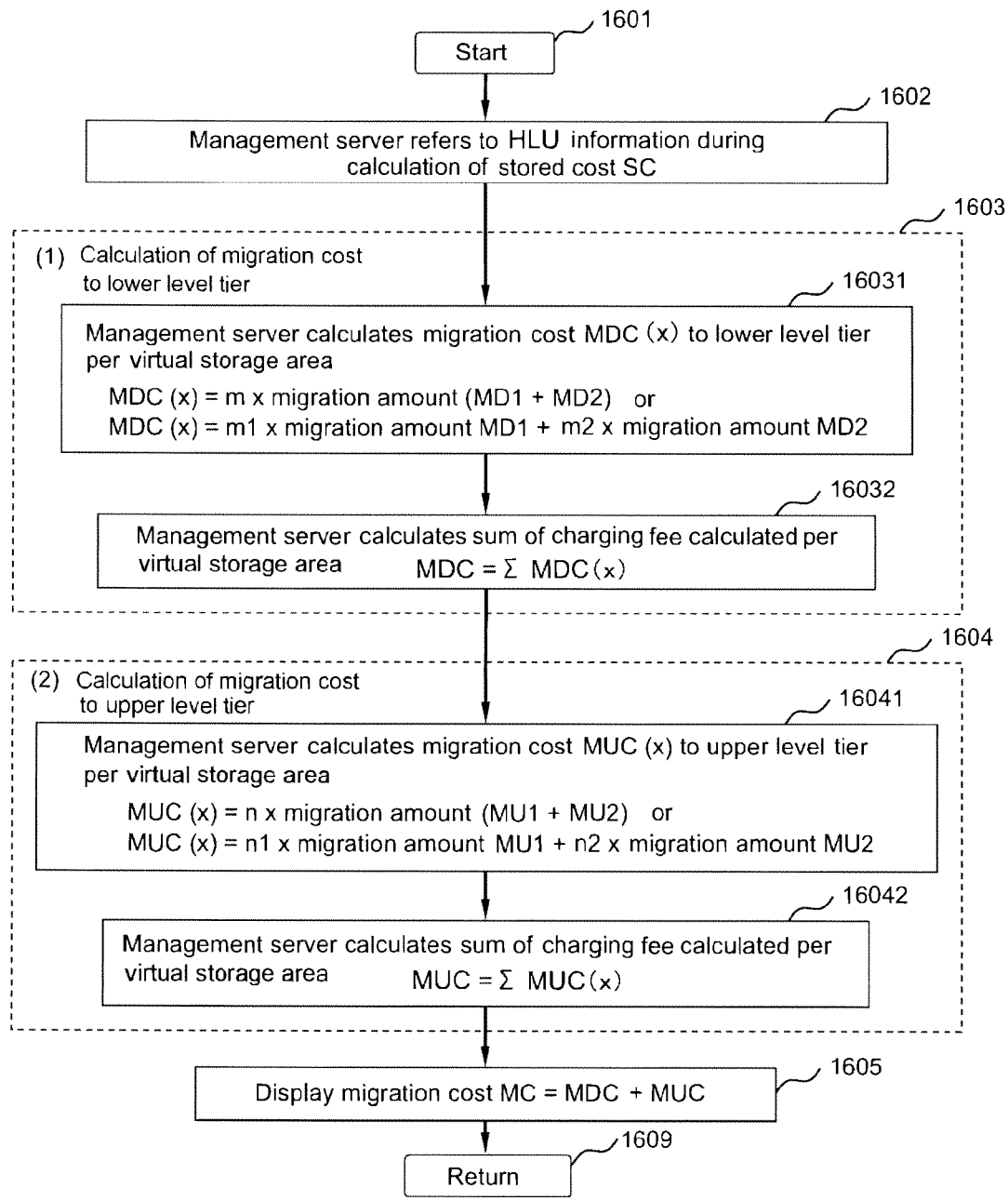
FIG. 16 is a flowchart showing a process for calculating migration costs.

FIG. 16 is a flowchart showing the process for calculating the migration cost MC. In the process for calculating the migration cost MC, two types of migration costs are calculated, (D1) a migration cost MDC (Migration Down lower-level tier Cost) for migration to the lower level tier and (D2) a migration cost MUC (Migration Up higher-level tier Cost) for migration to the upper level tier. First, the cost calculation program 1021 refers to the HLU information searched during calculation (step 1304) of the stored cost SC (step 1602).

(D1) Calculation of Cost for Migrating to Lower Level Tier (Step 1603)

The cost calculation program 1021 calculates the migration cost MDC($x$) ($x$ being the number of the virtual storage area) to the lower level tier per virtual storage area in the HLU using the reference HLU information and the following expressions 3 or 4 (step 16031).

$$MDC(x) = m \times \text{migration amount (MD1+MD2)} \qquad \text{Expression 3}$$

$$MDC(x) = m1 \times \text{migration amount MD1} + m2 \times \text{migration amount MD2} \qquad \text{Expression 4}$$

MD1: Migration amount from Tier 1 to Tier 2 (MB)

MD2: Migration amount from Tier 2 to Tier 3 (MB)

m: migration cost coefficient to lower level tier per unit migration amount (yen/MB)

m1: migration cost coefficient from Tier 1 to Tier 2 per unit migration amount (yen/MB)

m2: migration cost coefficient from Tier 2 to Tier 3 per unit migration amount (yen/MB)

The migration amounts MD1 and MD2 are calculated via a migration amount calculation unit 2212 of the automatic tier relocation program 221. The actual method thereof is as follows:

(F1) The size (1 GB or 42 MB) in the virtual LU address mapping table 2141 (size 903 of FIG. 9 or size 1103 of FIG. 11) is set as the migration amount.

(V1) The number of pages constituting each SLU and the actual used amount for actually storing data of the respective pages is set as the migration amount.

The selected migration amount and the migration count to the lower level tier (Tier 1 to Tier 2 and Tier 2 to Tier 3) 1109 of the migration parameters in the information management table are multiplied to determine the migration amount MD1 and MD2 to the lower level tiers.

We will now describe the reason for using the concept of (V1). There are a variety of data handled by the host computer 130, the file server 120 and the client terminal 150, and the data sizes vary. For example, the data size of programs such as the OS (Operating System) or AP (Application Program) is in units of MB or GB. The free rate of the area is small since the area of multiple pages are used to store data having such large data size. In order to store a program having a size of 800 MB in a page pool composed of 42 MB/page, 20 pages must be used, but the 20th page uses only 2 MB (800 MB-42 MB/page×19 pages). However, 800 MB is used with respect to the total capacity of 20 pages which is 840 MB, so the usage rate is approximately 95%.

On the other hand, user data includes e-mails, document files and image data such as still images and moving images.

Especially, the size of text format data such as e-mails and document files is approximately a few KB (kilobytes) to tens of kilobytes. If a page having a unit size of 42 MB is assigned to such small size data, the actually used portion (the actual usage rate is less than 10%) is small and the remaining portion will all be "0". Therefore, the transition of data corresponding to a whole capacity of a single page to a different tier will take up much transition time and deteriorate the performance of the storage device 200.

Thus, regarding the file unit data 2200 such as that shown in FIG. 22, the file capacity and the storage position of the data are checked via the file size 22013 and the offset 22014 stored in the metadata section 2201, so that the migration amount calculation unit 2212 of the automatic tier relocation program 221 executes migration so that only the data within the area where the file exists is migrated. This process enables to reduce the amount of data being migrated and the migration cost thereof. The same stands for block unit data. Moreover, as for data overlapped portions, it is possible to migrated only one of the overlapped portions.

The migration cost coefficients m1 and m2 of the unit migration amount are coefficients for calculating the migration costs for migrating a unit migration amount from Tier 1 to Tier 2 or from Tier 2 to Tier 3 (yen/MB). The coefficients are varied according to the migration destination (or migration source) tier to enable detailed cost calculation. It is possible to use the same migration cost coefficients m1 and m2 (which are fixed regardless of the migration destination/migration source tier) so as to calculate the costs in a simplified manner (expression 3). In the present embodiment, "yen/MB" is used as the unit, but "yen/GB" or "yen/KB" can also be used.

Next, the cost calculation program 1021 calculates the sum MDC of the migration cost MDC(x) to the lower level tier calculated per virtual storage area using expression 5 (step 16032).

[Math.2]

$$MDC = \Sigma MDC(x) \quad (x\text{:virtual storage area number}) \qquad \text{Expression 5}$$

The above description explained the process for calculating the migration cost for migrating data to a lower level tier.

(D2) Migration to Upper Level Tier (Step 1604)

Next, the cost calculation program 1021 calculates the migration cost MUC(x) per virtual storage area within the HLU for migration to the upper level tier based on the reference HLU information and the following expressions 6 or 7 (step 16041).

$$MUC(x) = n \times \text{migration amount (MU1+MU2)} \qquad \text{Expression 6}$$

$$MUC(x) = n1 \times \text{migration amount MU1} + n2 \times \text{migration amount MU2} \qquad \text{Expression 7}$$

MU1: Migration amount from Tier 2 to Tier 1 (MB)
MU2: Migration amount from Tier 3 to Tier 2 (MB)
n: migration cost coefficient to upper level tier per unit migration amount (yen/MB)
n1: migration cost coefficient from Tier 2 to Tier 1 per unit migration amount (yen/MB)
n2: migration cost coefficient from Tier 3 to Tier 2 per unit migration amount (yen/MB)

The concepts of the migration amount calculation and migration cost coefficients are the same as those for migration to the lower level tier. In other words, either (F1) or (V1) described above is set as the migration amount. The selected migration amount and the number of migration to the upper level tier (Tier 2 to Tier 1 and Tier 3 to Tier 2) of the migration parameter in the information management table are multiplied to determine the migration amounts MU1 and MU2 to the upper level tier. Further, the migration cost coefficients n1 and n2 of unit migration amount are coefficients (yen/MB) for calculating the migration costs for migrating a unit migration amount from Tier 2 to Tier 1 and for migrating a unit migration amount from Tier 3 to Tier 2. This arrangement enables to calculate costs more precisely by varying coefficients according to the migration destination (or migration source) tier. It is also possible to set the same value as the migration cost coefficients n1 and n2 (so that the value is fixed without depending on the migration destination/migration source tier) so as to enable simplified cost calculation (Expression 6). According to the present example, the unit of cost coefficient is "yen/MB", but the unit can also be "yen/GB" or "yen/KB".

Next, the cost calculation program 1021 calculates the sum MUC of the migration cost MUC(x) to the upper level tier calculated per virtual storage area via expression 8 (step 16042].

[Math.3]

$$MUC = \Sigma MUC(x) \quad (x\text{:virtual storage area number}) \qquad \text{Expression 8}$$

Next, the migration cost MC is computed via expression 9.

$$MC = MDC + MUC \qquad \text{Expression 9}$$

Lastly, the migration cost MC is displayed on the display area 14032 of the cost display range 1403 of the management screen 1400 (step 1605) and the process is ended. As for the display of migration cost, not only the migration cost MC but also the migration costs to respective tiers can be displayed. The process for calculating the migration cost for migrating to the upper level tier has been described.

Finally, when the stored cost SC and the migration cost MC had been calculated, the total cost TC is calculated based on expression 10.

$$TC = SC + MC \qquad \text{Expression 10}$$

The calculated total cost TC is displayed on a display area 14033 of the cost display range 1403 of the management screen 1400 (step 1306) and the process is ended.

In further detail, a case for assigning physical areas from the pool in page units to the virtual storage areas of the HLU is taken as an example in explaining the process according to the following steps (1) through (6).

(1) Input of Data
The administrator or the user enters the LU name "HLU-1" to the input area 1401.

(2) Transmission of Entered Data
The management server 100 (cost calculation program 1021) transmits the entered "HLU-1" to the storage device 200.

(3) Acquisition of Migration Count and Stored Time
Next, the storage device 200 acquires the migration parameters 1205 corresponding to the received LU number "HLU-1". For example, regarding virtual storage area number 0001 of HLU-1 (FIG. 11), the migration count to the upper level tier and the migration count to the lower level tier are both "0", and data has been stored (retained) in Tier 1 for "100 Hr". Therefore, the currently stored tier information is "1" unchanged from the initially assigned tier level, and the I/O accesses count to data in Tier 1 is "89".

Regarding virtual storage area number 0003 of HLU-1 (FIG. 11), the migration count to the upper level tier is "3" for both migration from Tier 2 to Tier 1 and from Tier 3 to Tier 2. As for the migration count to the lower level tier, the migration from Tier 1 to Tier 2 is "4" and the migration from Tier 2 to Tier 3 is "3". Therefore, the currently stored tier information is "2" and the I/O access count to data in Tier 2 is "75".

Further, the data stored time T1 in Tier 1 is "20 Hr", the data stored time T2 in Tier 2 is "50 Hr" and the data stored time T3 in Tier 3 is "30 Hr". The storage device 200 transmits the HLU information in the information management table corresponding to the requested HLU number to the management server 100.

(4) Calculation of Stored Cost

The management server 100 (cost calculation program 1021) receives the HLU information of the management information table corresponding to the requested HLU number from the storage device. The cost calculation program 1021 calculates the stored cost based on the "data stored time T1 to T3 for respective tiers" in the received management information and expression 1. For example, Virtual storage area number 0001 of HLU-1: SC(0001)= S1×100

Virtual storage area number 0003 of HLU-1: SC(0003)= S1×20+S2×50+S2×30

The stored cost SC(x) for each virtual storage area is calculated, and the sum SC is calculated.

(5) Calculation of Migration Cost

Similarly, the cost calculation program 1021 calculates the migration amount and migration cost based on the "number of migration" and the "virtual storage area capacity 42 MB" of the received management information. No migration occurred for virtual storage area number 0001 of HLU-1, so the migration amount is "0". The migration cost MDC(0001) and the MUC(0001) is also 0 yen.

As for virtual storage area number 0003 of HLU-1;
Migration amount (Tier 2 to 1) MU1=42 MB×3=126 MB
Migration amount (Tier 3 to 2) MU2=42 MB×3=126 MB
Migration amount (Tier 1 to 2) MD1=42 MB×4=168 MB
Migration amount (Tier 2 to 3) MD2=42 MB×3=126 MB
and,
MDC(0003)=m1×MD1 (=168 MB)+m2×MD1 (=126 MB)
MUC(0003)=n1×MU1 (=126 MB)+n2×MU2 (=126 MB); therefore, MC(0003)=MDC(0003)+MUC(0003). As described, the migration cost MC(x) per virtual storage area is calculated, and the sum MC thereof is calculated.

(6) Calculation of Total Cost

Lastly, the total cost TC is calculated based on the calculated stored cost SC and the migration cost MC, and the value thereof is displayed on the management screen 1400. Further, it is possible to click a select button 1405 and 1406 to select the calculation based on composition or calculation based on used capacity and to simultaneously display the same on the management screen 1404 having the display areas 1407 and 1408 on which the results of calculation of costs are displayed for comparison.

As described, the present system enables to calculate not only the stored costs but also the migration costs, and to display the calculated results on the display screen to notify costs to the administrator or the user. Further, the present system also enables to display the stored costs and the migration costs of the respective tiers and to display the comparison thereof with costs calculated based on the composition rate or capacity of used tiers. Further, the above description described a case where the cost calculation program 1021 is operated on the management server 100, but the cost calculation can be performed by storing the cost calculation program 1021 in the storage device 200 (dotted line section 1021 of FIG. 2). In that case, the management server 100 should only enable input of the LU name or the user name and the display of the cost calculation results. As described, the present embodiment enables to provide a service capable of presenting the detailed contents of costs to the administrator or the user which had not been possible according to the prior art.

<Embodiment 2>

Figure 17:
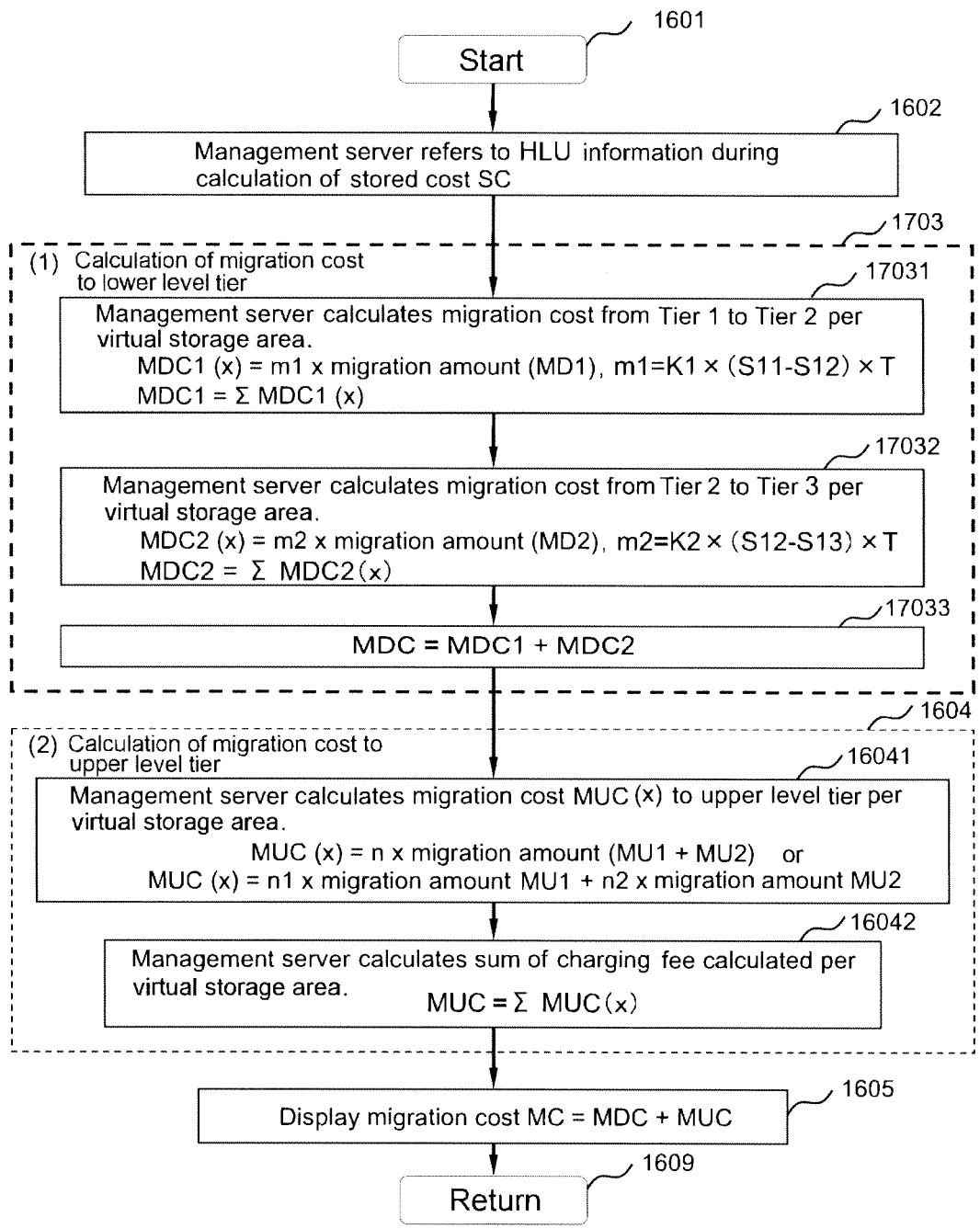
FIG. 17 is a flowchart showing a process for calculating migration costs according to a second embodiment of the present invention.

We will now describe an adjustment of migration cost according to a second embodiment of the present invention with reference to FIG. 17. The present embodiment devised the migration cost calculation step 1603 for migration to a lower level tier in FIG. 16 so that the increase of migration cost caused by migrating to the lower level tier (amount of incased cost) does not exceed the effect of reduction of the stored cost (amount of reduced cost) as shown in step 1703 of FIG. 17.

Actually, the cost for migrating to lower level tiers is calculated considering the stored costs in Tier 1, Tier 2 and Tier 3. Here, the stored costs in respective tiers per unit amount and unit time are referred to as S11, S12 and S13, respectively. In other words:

S11: Stored cost per unit time of unit amount in Tier 1 (yen/(Hr×MB))

S12: Stored cost per unit time of unit amount in Tier 2 (yen/(Hr×MB))

S13: Stored cost per unit time of unit amount in Tier 3 (yen/(Hr×MB))

Further, the interval for performing migration of SLU/page among tiers (dynamic tiering) is referred to as T (Hr). When dynamic tiering is performed at fixed intervals, T becomes a constant, and if dynamic tiering is not performed at fixed intervals, T can be calculated by adding up the intervals at which dynamic tiering is performed. The migration costs MDC1(x) and MDC2(x) to lower level tiers are calculated via the following expressions. Here, x represents the virtual storage area number.

$$MDC1(x) = m1 \times \text{migration amount MD1} \quad \text{Expression 11}$$

$$MDC2(x) = m2 \times \text{migration amount MD2} \quad \text{Expression 12}$$

$$m1 = K1 \times (S11 - S12) \times T \quad \text{Expression 13}$$

$$m2 = K2 \times (S12 - S13) \times T \quad \text{Expression 14}$$

MD1: Amount of migration from Tier 1 to Tier 2 (MB)
MD2: Amount of migration from Tier 2 to Tier 3 (MB)
K1, K2: Adjustment coefficient (value greater than 0 and smaller than 1)
Further,
[Math.4]

$$MDC = \Sigma MDC1(x) + \Sigma MDC2(x) \quad \text{Expression 15}$$

The difference between the present embodiment and embodiment 1 is that the present embodiment calculates coefficients m1 and m2 considering the stored costs in the respective tiers. By setting coefficients m1 and m2 as mentioned above, the increased amount of migration cost will not exceed the reduced amount of stored cost, so that an acceptable cost for the user can be calculated in an effective manner As described, the migration costs can be adjusted so that the total costs are not increased. Thus, the present embodiment enables to provide services that benefit users.

<Embodiment 3>

Figure 18:
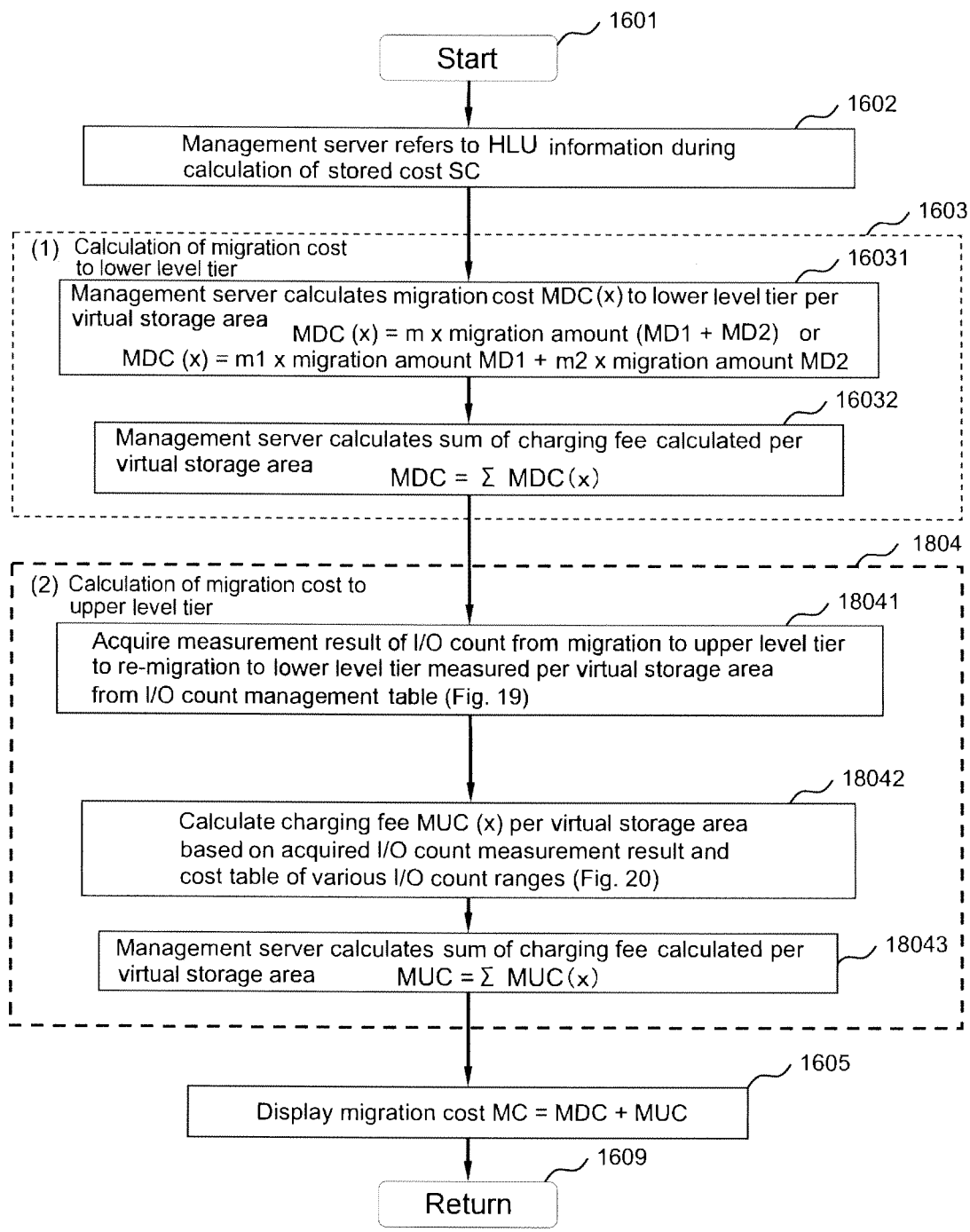
FIG. 18 is a flowchart showing a process for calculating migration costs according to a third embodiment of the present invention.

We will now describe a method for calculating migration costs for migrating data to upper level tiers according to a third embodiment of the present invention with reference to FIGS. 18 to 20. The present embodiment calculates migration costs based on the I/O access counts that occur from the time the data is moved from the lower level tier to the upper level tier to when the data is re-migrated to the lower level tier. In other words, the migration cost calculating step 1604 for migration to the upper level tier is devised as shown in step 1804 of FIG. 18.

FIG. 18 is a flowchart showing a process for calculating migration costs according to a third embodiment of the present invention. FIG. 19 is a view showing one example of an I/O count management table according to the third embodiment of the present invention. FIG. 20 is a view showing one example of a table of costs of different I/O count ranges according to the third embodiment of the present invention.

Reference number 1901 of the I/O count management table 1900 in FIG. 19 shows the HLU number for specifying the virtual storage area of HLU, and 1902 shows the virtual area number. Reference number 1903 refers to the I/O access counts occurring from the time data is migrated from Tier 2 to Tier 1 to the time the data is re-migrated to Tier 2. Reference number 1904 refers to the I/O access count occurring from the time data is migrated from Tier 3 to Tier 2 to the time the data is migrated again to Tier 3.

Actually, the I/O access count (from Tier 2 to Tier 1) 1902 corresponding to HLU number 1901 is "20:30:05". This number "20:30:05" indicates that data was migrated to Tier 2 when 20 I/O accesses occurred after the first data migration to Tier 1, data was migrated to Tier 2 when 30 I/O accesses occurred after the second migration to Tier 1, and data was migrated to Tier 2 when five I/O accesses occurred after the third migration to Tier 1.

FIG. 20 shows an example in which the costs are varied according to the I/O access counts and the tier levels. Cost 2002 is associated with the I/O access count 2001 after data is migrated from Tier 2 to Tier 1, and cost 2004 is associated with the I/O access count 2003 after data is migrated from Tier 3 to Tier 2.

For example, if the I/O access count after migrating data from Tier 2 to Tier 1 is 10 or smaller, no migration cost will occur. If the count is 11 or greater and 30 or smaller, the generated cost is FFF yen, and if the count is 31 or greater, the cost is GGG yen. The association between the cost and the I/O access count 2001 after migrating data from Tier 3 to Tier 2 is determined in a similar manner, wherein if the number of I/O count is 10 or smaller, no migration cost will occur, wherein if the number is 11 or greater and 30 or smaller, the generated cost is HHH yen, and if the count is 31 or greater, the cost is JJJ yen.

(1) The management server 100 (cost calculation program 1021) acquires from the storage device 200 the result of counting the number of I/O accesses (I/O count management table) from migration to upper-level tier to re-migration to lower-level tier such as the host computer 130 (step 18041). The storage device 200 in normal operation starts counting the number of I/O accesses at the timing of data migration to the upper level tier and continues counting the number until the data is migrated to the lower level tier. The counting is repeated for each SLU/page and every time data is migrated to the upper level tier, by which the I/O count management table of FIG. 19 is created. The I/O access count can also be the I/O access count per unit time.

(2) The cost calculation program 1021 calculates the cost MUC (x) per virtual storage area based on the I/O count measurement result for each tier and the cost table of various I/O count ranges of FIG. 20 (step 18042).

(3) Next, the sum of calculated costs MUC (x) per virtual storage area is calculated using expression 8 (step 18043).

[Math.5]

$$MUC = \Sigma MUC(x)(x\text{:virtual storage area number})\quad\text{Expression 8}$$

As described, by counting the I/O accesses of the tier after migrating data instead of measuring the migration amount, it becomes possible to prevent migration cost from occurring when there is no advantageous effect of migrating data to the upper level tier or to reduce the migration cost when there is little effect. The present embodiment enables to realize a more preferable cost calculation, so that a user-friendly service can be provided.

<Embodiment 4>

Figure 21A:
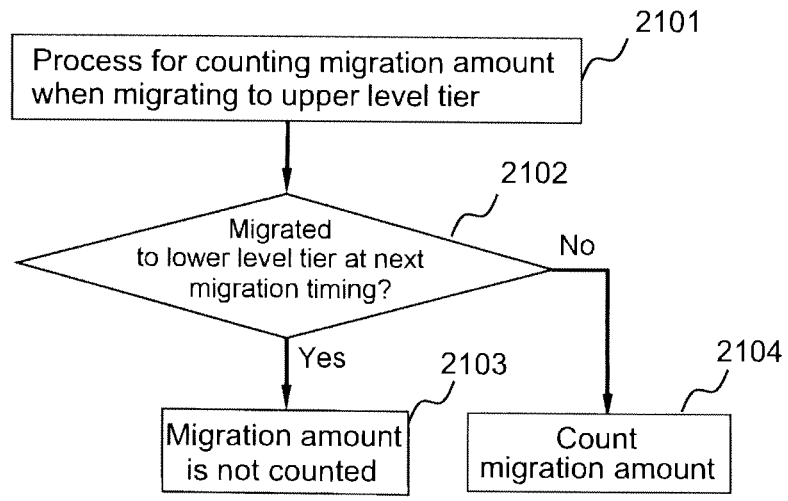
FIG. 21A is a flowchart showing one example for calculating a migration amount according to a fourth embodiment of the present invention.

The fourth embodiment of the present invention regarding the calculation of migration cost to the upper level tier will be described with reference to FIGS. 21A and 21B. According to the present embodiment, when data is migrated from the lower level tier to the upper level tier and then re-migrated to the lower level tier at the next migration timing, it is assumed that the data has not migrated, and no migration cost is charged.

The storage device 200 does not count the number of migrations to the upper level tier of the migration parameters when migrating data to the upper level tier, but determines whether migration to the lower level tier occurred or not at the next migration timing (step 2102). If migration to the lower level tier occurred ("Yes" of step 2102), it is determined that the number of I/O accesses to the SLU/page assigned to the virtual storage area was smaller than a given value, and the migration amount is not counted (step 2103).

On the other hand, when there was no data migration to the lower level tier at the next migration timing ("No" of step 2102), it is determined that the SLU/page assigned to the virtual storage area had I/O accesses exceeding the given value, so the migration amount from the lower level tier to the upper level tier is counted (step 2104). In other words, the migration cost corresponding to the migration amount from the lower level tier to the upper level tier is calculated and charged.

Figure 21B:
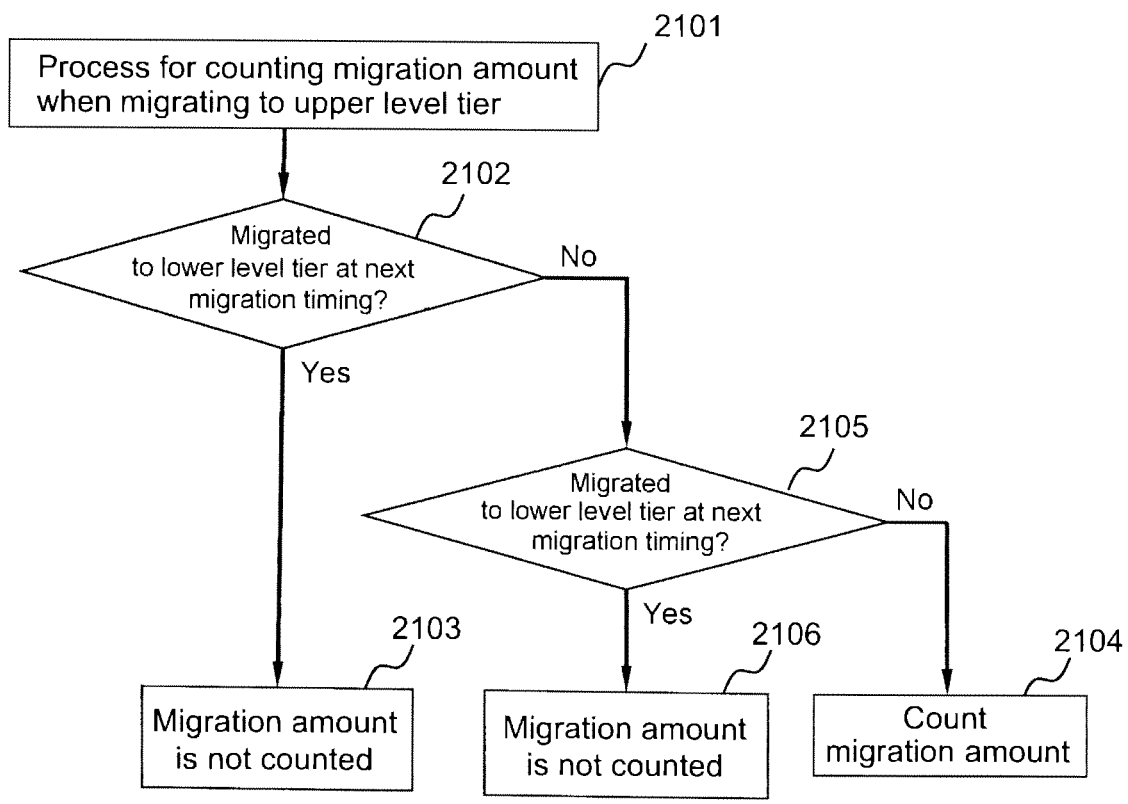
FIG. 21B is a flowchart showing one example for calculating a migration amount according to the fourth embodiment of the present invention.

Further in FIG. 21B, the storage device 200 determines whether migration to the lower level tier has occurred in succession at migration timings. In FIG. 21B, it is determined whether migration to the lower level tier occurred at the next migration timing after migration to the upper level tier (step 2102).

When migration has occurred ("Yes" of step 2102), it is determined that the number of I/O accesses to the SLU/page assigned to the virtual storage area was smaller than a given value, and the migration amount is not counted (step 2103). In other words, the migration cost is set to 0 yen and not charged.

On the other hand, when migration did not occur ("No" of step 2102), it is redetermined whether migration to the lower level tier has occurred at the next migration timing (step 2105). When migration has occurred ("Yes" of step 2105), it is determined that the number of I/O accesses to the SLU/page assigned to the virtual storage area was smaller than a given value, and the migration amount is not counted (step 2106). In other words, the migration cost is set to 0 yen and not charged.

On the other hand, when migration to the lower level tier has not occurred ("No" of step 2105), it is determined that the number of I/O accesses to the SLU/page assigned to the virtual storage area has exceeded the given value, and the migration amount from the lower level tier to the upper level tier is counted (step 2104). In other words, the migration cost corresponding to the migration amount from the lower level tier to the upper level tier is calculated and charged.

The present embodiment counts the number of migration when migration to the lower level tier does not occur twice in a row. The number for determining whether migration to the lower level tier occurred can be changed arbitrarily.

As described, the present embodiment assumes that no migration has occurred if migration to the lower level tier occurs again at a next migration timing after migrating from a lower level tier to an upper level tier, so as to prevent unnecessary migration costs from being charged.

As described, the present embodiment enables to calculate not only the stored cost but also the migration cost and to display the same on a display screen, so as to notify the costs to the administrator or the user. Further, the present embodiment enables to display stored costs and migration costs of respective tiers, and to display a comparison of costs calculated based on composition rates and capacities of the used tiers. As described, the present embodiment provides a service capable of presenting detailed contents of costs to the administrator or the user, that had not been possible according to the prior art. Moreover, the present embodiment enables efficient use of resources and reduction of running costs such as operation and maintenance costs.

Industrial Applicability

The present invention can be applied to storages systems and information processing apparatus such as large-scale computers, servers and personal computers.

Reference Signs List

1 Storage system
100 Management server
101 Processor
102 Memory
1021 Cost calculation program
103, 121, 131, 151 Internal storage device
104 Input unit
105 Output unit
140 Dedicated line, 160 Public line
110 Network
120 File server, 130 Host computer, 150 Client terminal
200 Storage device
210 Disk control unit
211 Control unit
212 Host I/F control unit
213 File control unit
214 Metadata memory
2141 Virtual LU address mapping table
2142 Information management table
215 Data transfer control unit
216 Cache memory
217 Battery
218 Device I/F control unit
220 Data control unit
221 Automatic tier relocation program
2211 Data location management unit
2212 Migration amount calculation unit
250 Memory device unit
251 Tier 1 memory device
252 Tier 2 memory device
253 Tier 3 memory device
255 Memory device
501 Port
502 Virtual volume
503 Virtual page area
5031 Virtual page—real page mapping line
504 Shared memory
5041 Mapping management information
505 Mapping management information backup area
5061 Pool volume
5062 Real page
506 Pool
600 Page area
701 Write request
702 New area assignment
7023, 7024 Data area
703 Monitoring
7031 SLU/page monitoring information
704 Optimum tier determination
801 High load area (high speed device assignment area)
802 Middle load area (middle speed device assignment area)
803 Low load area (low speed device assignment area)
804 No load area (ultraslow device assignment area)
805 Tier 4 memory device
900, 1100 Virtual LU address mapping table
1000, 1200 Information management table
1400, 1404 Management screen
1900 I/O count management table
2000 Cost table of various I/O count ranges

The invention claimed is:

1. A storage system composed of
a storage device coupled to one or more upper level devices and a management terminal;
the storage device comprising
a plurality of memory device units assigned to different tiers respectively,
a data location management unit configured to manage location of data in the respective tiers and migration of data among the tiers, and
a migration amount calculation unit configured to calculate a data storage time in the respective tiers and a data migration amount when data are migrated among the tiers;
the management terminal comprising an input unit, an output unit, and a cost calculation unit;
wherein based on a result calculated using the migration amount calculation unit, the cost calculation unit is configured to calculate:
(1) a stored cost for storing data in a tier;
(2) a first migration cost for migrating data to an upper tier level; and
(3) a second migration cost for migrating data to a lower tier level; and
at least one of the calculated costs (1) through (3) is displayed on the output unit of the management terminal;
wherein the second migration cost is calculated using at least a migration data amount, a migration destination tier level and a migration source tier level; and
wherein the calculation is performed so that an amount of increase in the second migration cost does not exceed an amount of decrease in the stored cost.

2. The storage system according to claim 1, wherein the stored cost is calculated based on a data capacity stored in the respective tier levels and a stored time thereof.

3. The storage system according to claim 2, wherein the first migration cost and the second migration cost are calculated based on the respective data migration amounts to migration destination tier levels.

4. The storage system according to claim 3, wherein the first migration cost is calculated based on the I/O access count from the upper level device occurring within a period of time from migration of data to the upper level tier to re-migration thereof to the lower level tier.

5. The storage system according to claim 4, wherein the I/O access count from the upper level device occurring within a period of time from migration of data to the upper level tier to re-migration thereof to the lower level tier is managed using an I/O count management table, and the calculation of the first migration cost is performed based on an I/O access count management information in the I/O count management table and a cost table of various I/O access count ranges showing the association between the range of I/O access counts and the migration costs.

6. The storage system according to claim 3, wherein when data are migrated from a lower level tier to an upper level tier at a tier migration timing and data are re-migrated to the lower level tier at the next tier migration timing, the first migration cost is set to zero; otherwise, the migration cost is calculated.

7. The storage system according to claim 6, wherein when data are migrated from a lower level tier to an upper level tier at a tier migration timing and data are not migrated to the lower level tier for the next two tier migration timings in a row, the first migration cost is calculated; otherwise, the first migration cost is set to zero.

8. The data storage system according to claim 3, wherein the address mapping information table is composed of a virtual logical volume number information, a start address which is an initial address of the virtual logical volume, a size which is the volume capacity, and a first real data storage area information or a second real data storage area information of the storage device.

9. The storage system according to claim 8, wherein
the I/O access count from the upper level device occurring within a period of time from migration of data to the upper level tier to re-migration thereof to the lower level tier is managed using an I/O count management table, and
the calculation of the first migration cost is performed based on an I/O access count management information in the I/O count management table and a cost table of various I/O access count ranges showing the association between the range of I/O access counts and the migration costs.

10. A method for calculating a tier relocation cost of a storage system composed of a storage device coupled to one or more upper level devices and a management terminal;
the storage device comprising
a plurality of memory device units assigned to different tiers respectively,
a data location management unit configured to manage location of data in the respective tiers and migration of data among the tiers, and
a migration amount calculation unit configured to calculate calculating a data storage time in the respective tiers and a data migration amount when data are migrated among the tiers;
the management terminal comprising an input unit, an output unit, and a cost calculation unit;
the method comprising:
based on a result calculated using the migration amount calculation unit, calculating, using the cost calculation unit:
(1) a stored cost for storing data in a tier;
(2) a first migration cost for migrating data to an upper tier level; and
(3) a second migration cost for migrating data to a lower tier level; and
displaying at least one of the calculated costs (1) through (3) is displayed on the output unit of the management terminals
wherein the method further comprising:
calculating the second migration cost using at least a migration data amount, a migration destination tier level and a migration source tier level; and
performing the calculation so that an amount of increase in the second migration cost does not exceed an amount of decrease in the stored cost.

11. The method for calculating a tier relocation cost of a storage system according to claim 10, wherein the first migration cost and the second migration cost are calculated based on the respective data migration amounts to migration destination tier levels.

12. The method for calculating a tier relocation cost of a storage system according to claim 11, wherein the first migration cost is calculated based on the I/O access count from the upper level device occurring within a period of time from migration of data to the upper level tier to re-migration thereof to the lower level tier.

* * * * *